United States Patent [19]

Frost

[11] 4,284,848

[45] Aug. 18, 1981

[54] SWITCHED NETWORK TELEPHONE SUBSCRIBER DISTRIBUTION SYSTEM

[76] Inventor: Edward G. Frost, 12000 Old Georgetown Rd., Rockville, Md. 20852

[21] Appl. No.: 62,785

[22] Filed: Aug. 1, 1979

[51] Int. Cl.³ ............................................. H04B 7/14
[52] U.S. Cl. ................................. 179/2 EB; 455/11; 455/54
[58] Field of Search ............... 179/2 E, 2 EB, 18 EA; 455/10, 11, 33, 54, 56

[56] References Cited

U.S. PATENT DOCUMENTS

| | | | |
|---|---|---|---|
| 3,745,462 | 7/1973 | Trimble | 455/11 |
| 3,955,140 | 5/1976 | Stephens et al. | 455/11 |
| 4,112,257 | 9/1978 | Frost | 455/33 |
| 4,125,808 | 11/1978 | Graham | 179/2 EB |
| 4,152,647 | 5/1979 | Gladden et al. | 179/2 EB |

Primary Examiner—Joseph A. Popek

[57] ABSTRACT

A network of telephone subscribers, located remote from the primary telephone system, includes subscriber stations having two frequency-agile, multi-channel duplex transceivers for communicating with a central office having one duplex transceiver for each channel. The central station includes controls for automatically configuring subscriber stations as repeaters to permit calls to and from other subscriber stations to be routed through repeater-configured subscriber stations. Signalling is transmitted out of band so that it can be transmitted via intermediate subscriber stations which may be involved in another call. The most direct available route for each call is continuously updated during the progress of the call to minimize the number of subscriber stations involved in the call. Each subscriber station serves two subscriber loops and permits calls between those loops without transmission via the central station. Likewise, calls between subscriber stations do not pass through the central station. The subscriber stations may be mobile radio-telephone stations.

32 Claims, 37 Drawing Figures

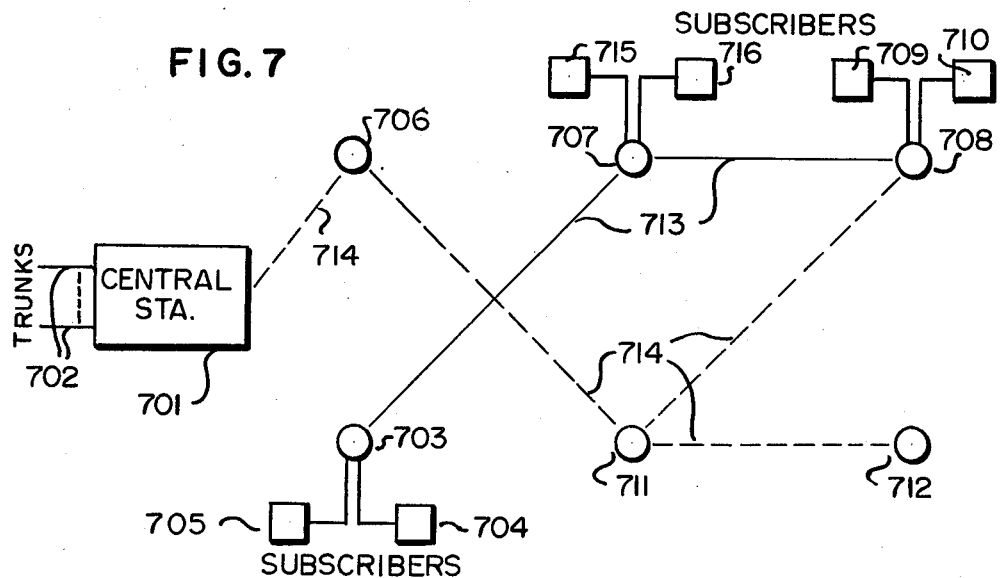
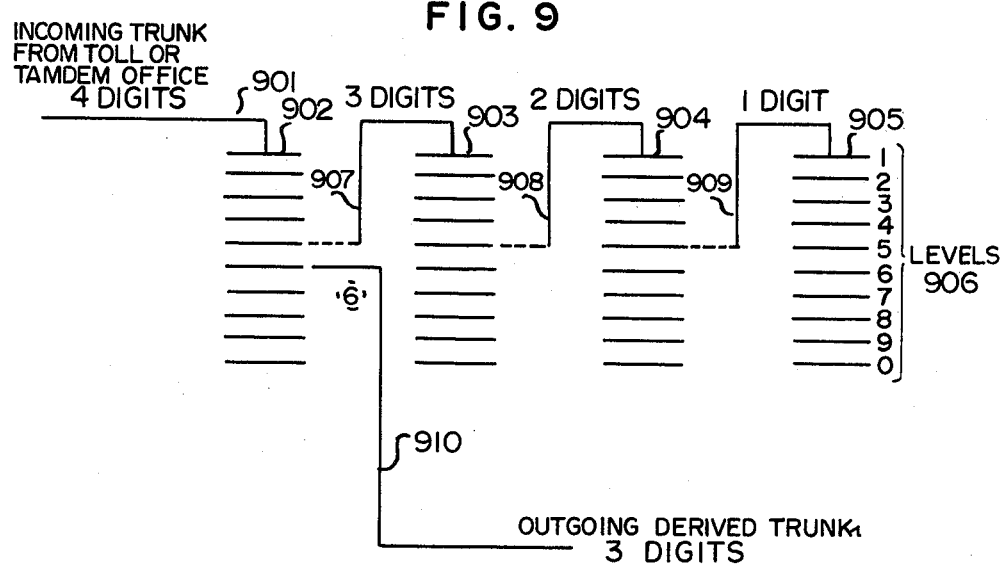
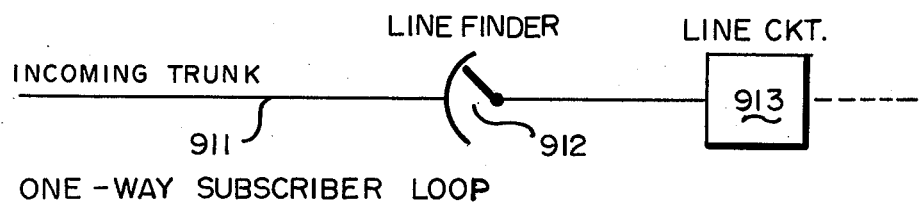

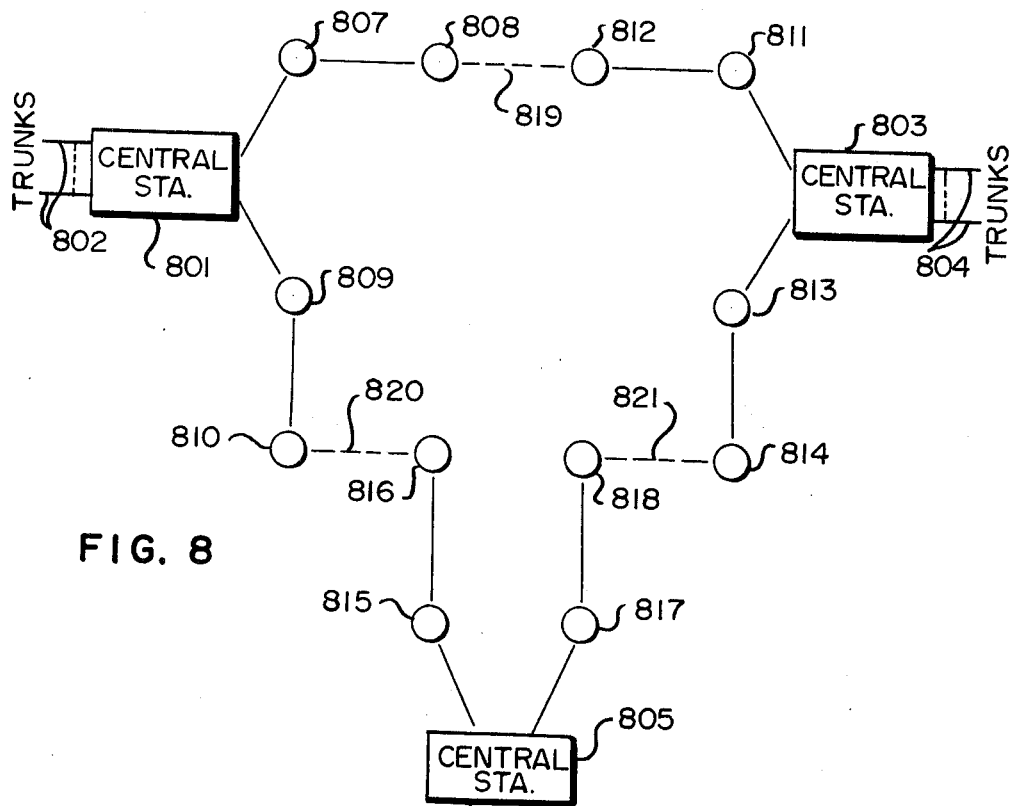
FIG. 8
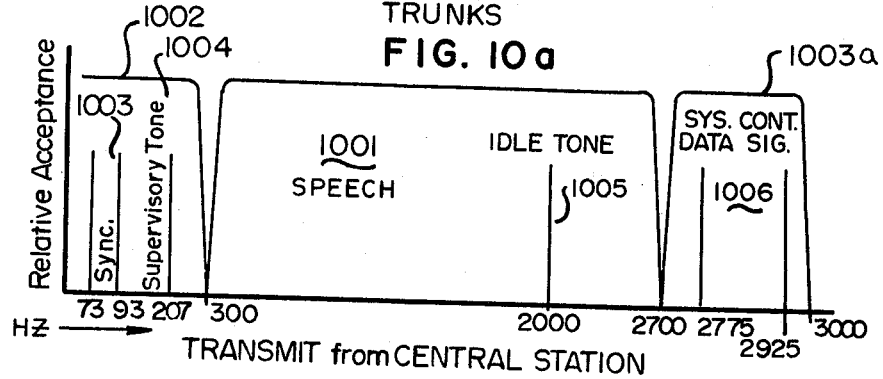
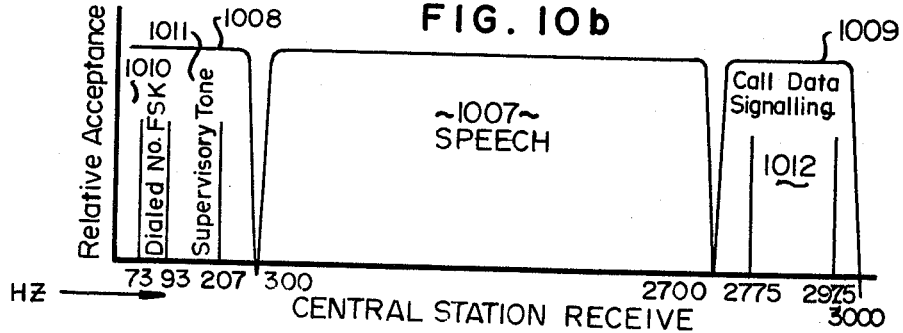

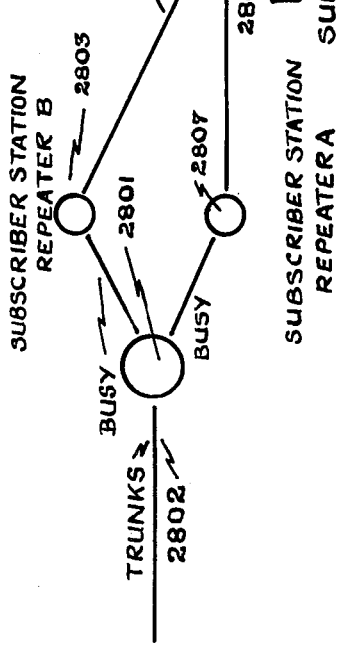
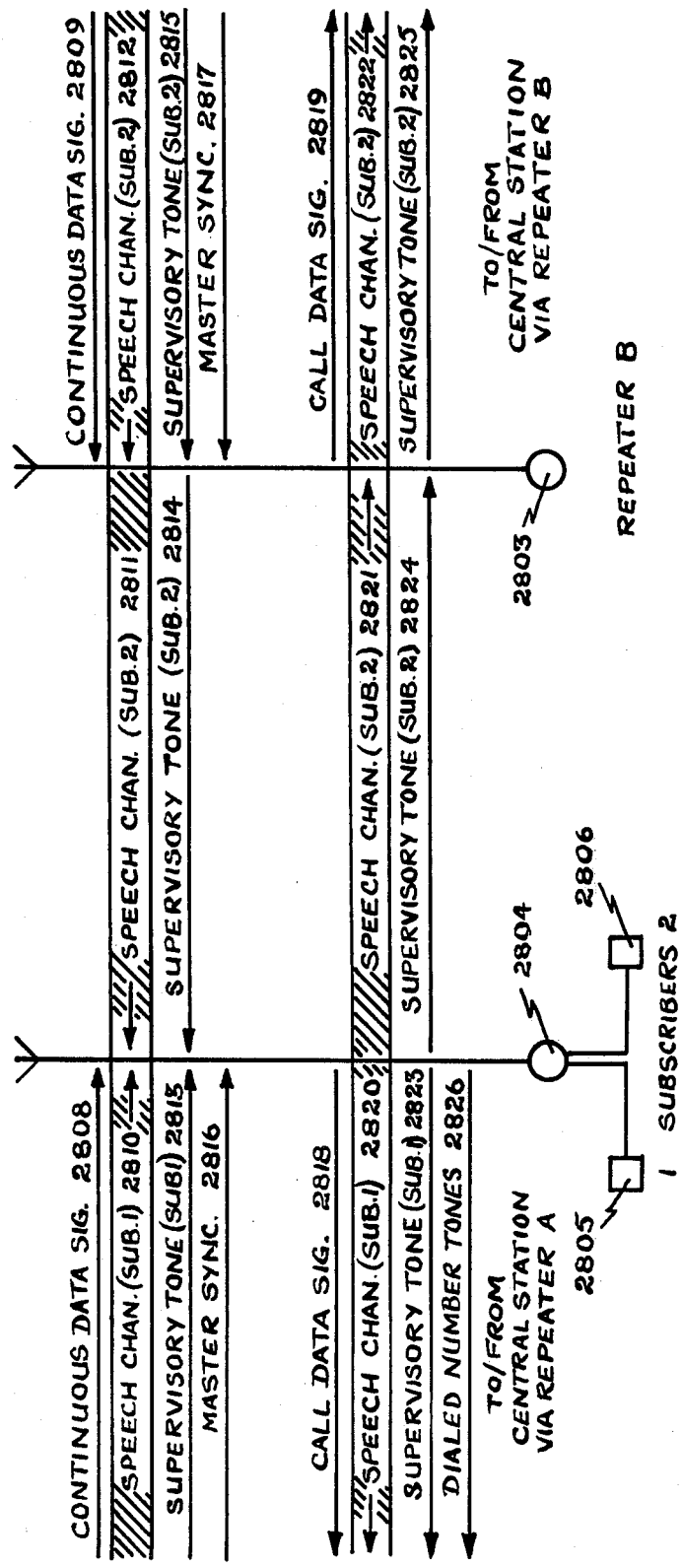
FIG. 28a
FIG. 28b

SWITCHED NETWORK TELEPHONE SUBSCRIBER DISTRIBUTION SYSTEM

TECHNICAL FIELD

This invention relates generally to telephone networks for subscribers located remote from the primary telephone system. More particularly, this invention relates to improvements in such networks whereby the network is provided in a truly switched network configuration.

BACKGROUND ART

Prior art remote telephone communication, using either a hard-wire or radio transmission medium, has distinct disadvantages. Generally, systems for providing such communications include a central base station which serves as the communication link between the remote network subscribers and the primary telephone system. The base station communicates with the network subscribers via channels which are fewer in number than the number of subscribers (i.e. the so-called trunk-type or concentrated-type system). There is no call routing capability in such a system; that is, there are no alternate paths for routing a call to a network. Further, all network subscriber stations must be close enough to the central or base station to receive all transmissions; alternatively, separate base station type repeaters must be employed, requiring additional expense. Moreover, if the network uses radio wave transmission, each subscriber station can service only one telephone subscriber. Still further, these types of networks have no capability of subscriber metering and ticketing.

It is therefore an object of the present invention to provide a switched network telephone distribution system, using radio or hard-wire transmission, which is capable of: alternate call routing; extending the range of the central station implant requiring separate repeater stations; and complete automatic subscriber metering and ticketing.

DISCLOSURE OF THE INVENTION

In accordance with the present invention, a switched network telephone subscriber distribution system is characterized by the use of the individual subscriber stations as switching stations to route calls as needed and serve as repeater stations for other stations beyond the transmission range of the central station. The subscriber stations include two separate duplex multi-channel transceivers which permits each subscriber station to serve two separate subscriber loops in addition to its routing and repeater functions. Control signalling is transmitted outside the voice band on all channels so that subscriber stations which are busy with calls or serving as repeaters can nevertheless be used to transmit signalling. Optimum routing of calls is continuously achieved. Network subscribers can communicate with one another without using central office communication channels.

BRIEF DESCRIPTION OF DRAWINGS

The above and still further objects, features and advantages of the present invention will become apparent upon consideration of the following detailed description of specific embodiments thereof, especially when taken in conjunction with the accompanying drawings of the present invention, wherein:

FIG. 7 is a schematic diagram illustrating a subscriber-to-subscriber call;
FIG. 8 is a schematic diagram illustrating use of hand-off routing;
FIG. 9 is a diagram illustrating telephone trunk derivation;
FIG. 10a is a plot of the transmit baseband from the central radio station;
FIG. 10b is a plot of the receive baseband from the central radio station;
FIGS. 28a and 28b are diagrams of a radio subscriber unit with both subscribers busy.

BEST MODE OF CARRYING OUT THE INVENTION

I. System Facilities and Capabilities

A. The invention described herein has primary utilization as a radio telephone network wherein network subscribers located remotely from a primary switched telephone system utilize radio transmission in communicating with subscribers in the primary system and with other remote network subscribers. It is to be understood at the outset, however, that the principles described herein are equally valid where the remote subscribers have hard-wire interconnections available for transmission to and from other network subscribers or to and from subscribers in the primary system. To simplify the following description, an exemplary system is chosen which utilizes radio transmission; it is important to bear in mind, however, that hard-wire transmission is also possible and clearly within the scope of the present invention.

Figure 1:
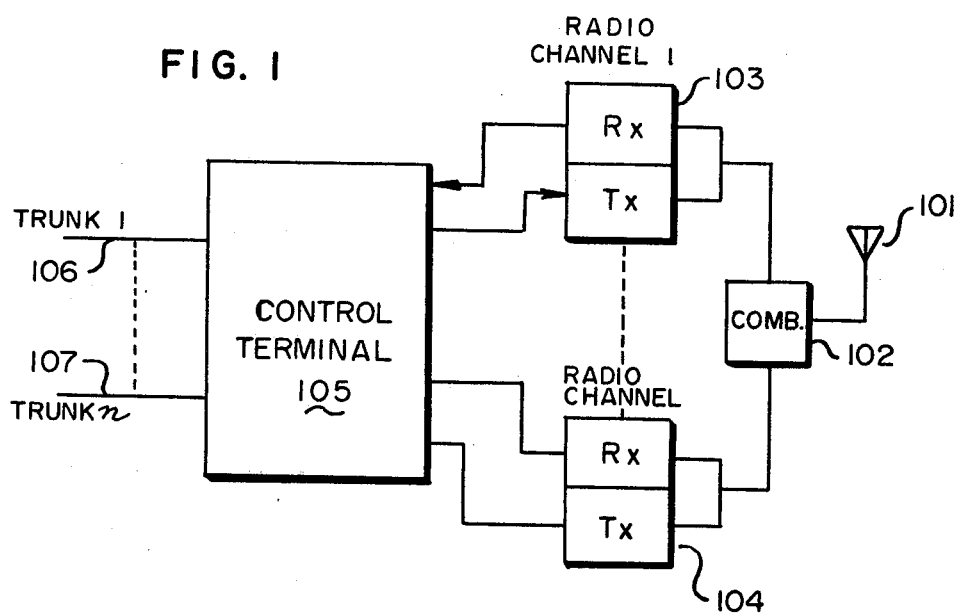
FIG. 1 is a block diagram of a central radio station.

FIG. 1 is a simple functional block diagram of a central radio station employed in the present invention to serve a switched network telephone subscriber distribution system which basically comprises a number of duplex radio transceivers 103, 104, in this case, utilizing a common antenna 101 via an antenna combiner 102, and a control unit or terminal 105. The control unit 105 provides system and call control for the radio network and also provides interconnection, via networks 106, 107, with a primary switched telephone system. The radio transceivers 103, 104 each operate on an individual duplex pair of radio frequencies and are not frequency-agile, i.e., they are not switchable to other than the assigned duplex radio channel. Subscriber metering and ticketing is provided by the control terminal.

Figure 2:
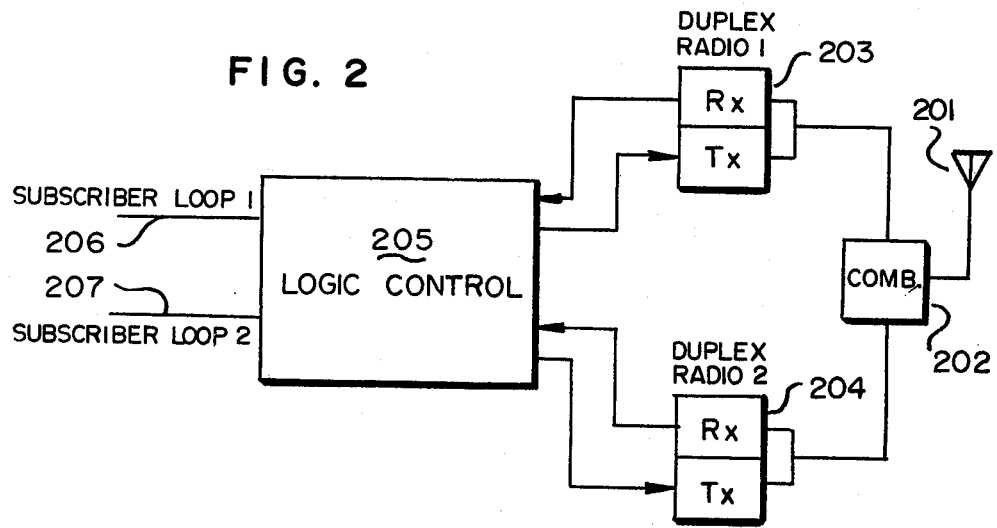
FIG. 2 is a radio subscriber station block diagram.

FIG. 2 is a simple functional block diagram of a radio subscriber station employed in the present invention. The station comprises two multi-channel frequency-agile duplex radio transceivers 203, 204, which use a single antenna 201 via an antenna combiner unit 202. The radio subscriber unit also includes logic control circuitry 205 which controls two separate switched network subscriber loops 206 and 207. In both the central radio station of FIG. 1 and the radio subscriber station of FIG. 2, separate antennas may be used for any or all radio transceivers if desired. The radio subscriber station is controlled by signalling from the central radio station and may be automatically configured either as a terminal station for calls to or from the instruments connected to the subscriber loops 206, 207, or as a radio repeater station for calls to/from other radio subscriber stations or between another such station and a subscriber in the primary switched telephone network.

B. Radio Switched Network

Figure 3:
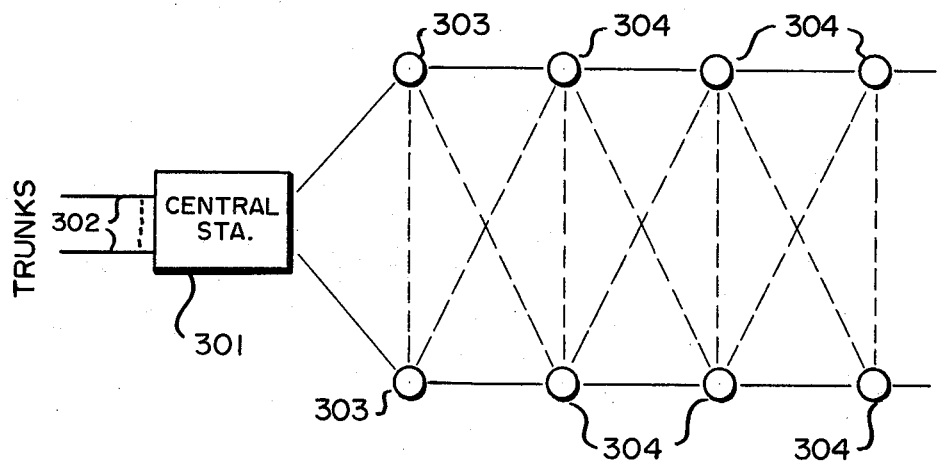
FIG. 3 is a schematic diagram of the switched telephone network.

FIG. 3 illustrates a typical switched network as may be provided in the present invention. The central radio station 301 is interconnected with the primary switched telephone network via the trunks 302. For preferred call routing to and from the radio subscriber stations 303, which have direct radio paths to the central radio station 301, no repeater is required. However, for calls to and from radio subscriber stations 304, which are assumed to be outside of the direct radio service area of the central radio station, it is necessary to use other radio subscriber stations as radio repeaters. Direct radio paths to the central station are illustrated by solid lines in FIG. 3; alternate paths are shown by dashed lines.

Figure 4:
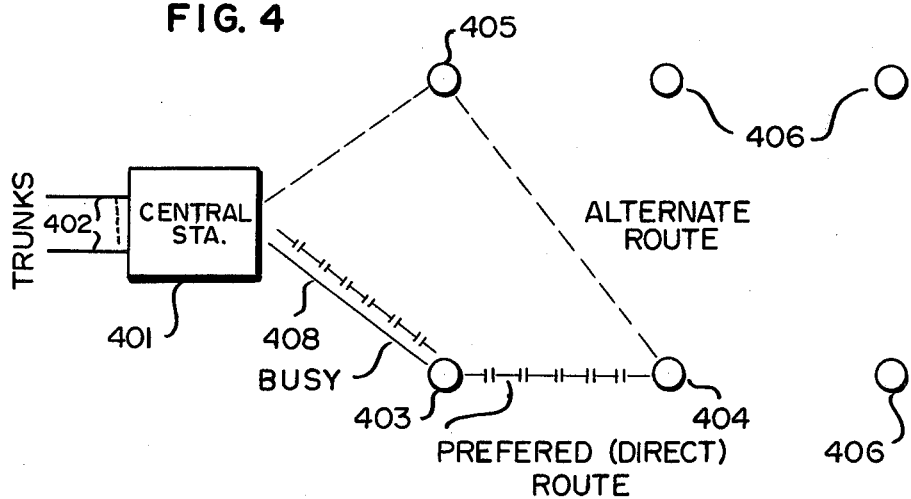
FIG. 4 is a schematic diagram of the network illustrating alternate call routing.

An alternate radio subscriber call routing condition is shown in FIG. 4. Radio subscriber station 403 is assumed to be busy with a call which employs a telephone trunk 402 to a primary telephone network subscriber and a direct radio channel 408 from central station 401. A call to or from radio subscriber station 404 cannot therefore be routed directly to the central radio station 401 using radio subscriber station 403 as a radio repeater. The call is established instead using radio subscriber station 405 as a radio repeater, thus providing alternate routing. Other radio subscriber stations 406 can be connected by alternate routing to the central radio station in a similar manner.

Figure 5:
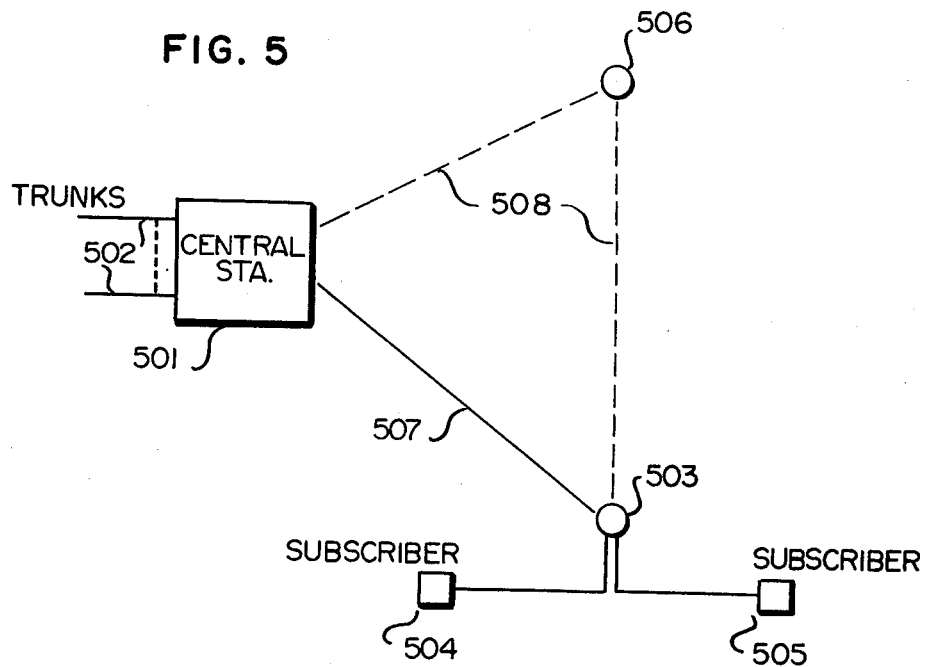
FIG. 5 is a schematic diagram of the network showing two subscribers using the same subscriber station and communicating with the central station.

FIG. 5 shows two switched network subscribers 504, 505, which share the same radio subscriber station 503. In the diagram shown, both subscribers 504 and 505 are assumed busy with calls via the central radio station 501 and trunks 502 to primary telephone system subscribers. Network subscriber 504 is assumed to be the first to receive or originate a call; thus, the direct preferred call route 507 to the central station 501 has been established for subscriber 504. The call to/from subscriber 505 must therefore be routed on alternate route 508 via radio subscriber station 506 configured as a repeater station.

Figure 6:
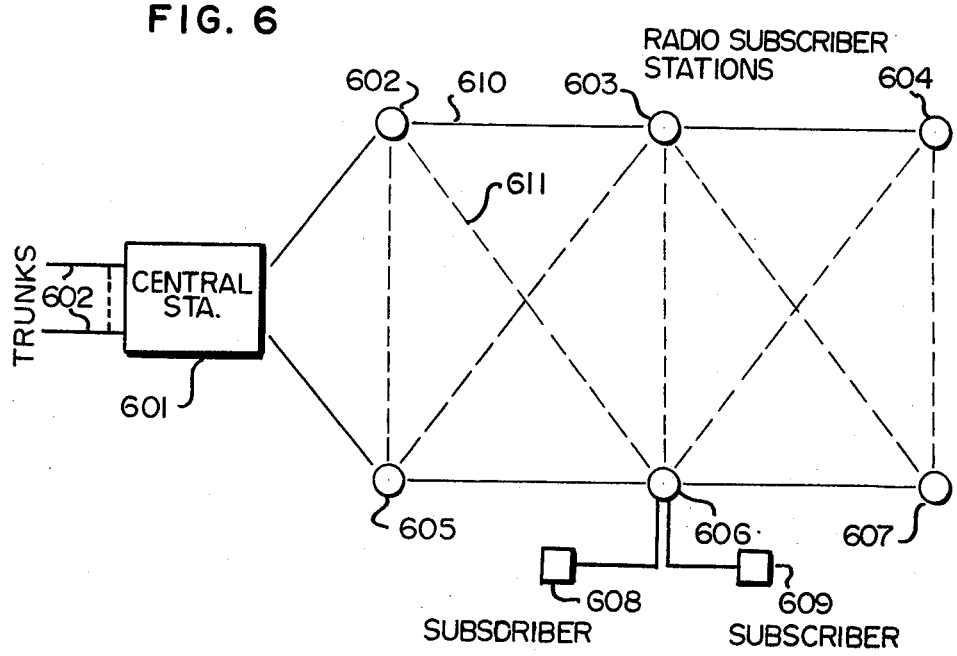
FIG. 6 is a schematic diagram of the network showing two subscribers using the same station together.

Two network subscribers 608 and 609 are shown in FIG. 6 sharing a common radio subscriber station 606. These subscribers may communicate directly with each other without using any radio channels by using the internal switching of the shared radio subscriber station 503. All radio subscriber stations 602 through 607 are assumed idle; thus, the solid line 610 shows the preferred call routing and the broken line 611 shows alternate possible call routing for any calls which may be placed to or from third-party radio network subscribers. The signalling subchannel in the radio baseband is used to establish the call after which it is released for use by others.

FIG. 7 illustrates how a call between network subscriber 704 to network subscriber 710 is routed. Radio subscriber station 707 is configured as a radio repeater for the call having a route indicated by the solid lines 713. The broken lines 714 show possible routing for calls involving either of the two subscribers connected to each of the radio subscriber stations 706, 711, 712 and/or the alternate subscribers 705 and 709 which use radio subscriber stations 703 and 708, respectively. The two network subscribers 715, 716 are temporarily blocked from communicating via radio channels as long as radio subscriber station 707 is used as a repeater. However, network subscribers 715, 716 may establish calls between themselves. Conference calls may also be established involving two or more radio subscribers and a primary telephone network subscriber and/or between three or more network subscribers. In the latter case, the central radio station 701 and associated telephone trunks 702 are not involved.

FIG. 8 shows a small number of radio subscriber stations belonging to portions of three switched radio network telephone subscriber distribution systems. The central radio stations 801, 803 and 805 are interconnected with the primary telephone system via trunks 802, 804 and 806, respectively. Central radio station 801 controls radio subscriber stations 807 through 810, central radio station 803 controls radio subscriber stations 811 through 814, and central radio station 805 controls radio subscriber stations 815 through 818. The radio subscriber stations 808 and 812 are located sufficiently close to each other to permit direct radio communication to be established between them if desired. Radio subscriber stations 810 and 816 are similarly located as are radio subscriber stations 814 and 818.

In cases of heavy telephone traffic via one or more of the central radio stations, such that no radio channels are readily available in that network, calls to or from subscribers in that network may be routed via the central radio of one of the other networks. For example, if one of the network subscribers connected to radio subscriber station 807 originates a call to a primary telephone system subscriber and all radio channels for central radio station 801 are busy, then the call can be routed through central radio station 803 via radio subscriber stations 808, 812 and 811 configured as radio repeaters. The call is set up primarily using the radio baseband signalling sub-channel via central radio station 801. The necessary call information is transferred to central radio station 803, via the primary telephone system, which establishes the call routing and sets up the call.

Hand-off call routes (i.e. routes between radio networks) are indicated by broken lines 819, 820 and 821.

c. Subscriber Call Metering and Ticketing

Control terminal 105 (FIG. 1), which controls the switched network, also provides complete subscriber call metering and ticketing information. For each call originated by a radio subscriber, the following information is stored: (a) Originating radio subscriber number; (b) Called subscriber number; (c) Date and time of call; (d) Call duration; and (e) Direct dialed/operator assisted call.

These five items of information are sufficient to provide comprehensive subscriber billing by application of appropriate call tariffs.

Additional call and call-attempt information is also compiled by the system for traffic engineering purposes on an individual subscriber basis; (a) Time taken to return dial tone; (b) Call attempt aborted—no dial tone returned within a specific time period; (c) All central office trunks busy; (d) Time taken to seize central office trunk; (e) Time and date for all functions; (f) Call routing—repeaters used; and (g) Repeater busy.

These items, in conjunction with the billing information, provide a comprehensive operational view of the system and enable complete traffic analyses to be made from time to time in order to extend or upgrade the system.

D. Central Office Trunk Interface

It is possible to interface a variety of different central office trunks with the central radio station control terminal. Apart from the two-way communication requirement of the trunks, the prime essentials for system operation are the abilities of the trunks to: (a) Repeat the required number of dialed digits from the primary telephone system to the control terminal for individual called network subscriber identification; (b) Receive digits or other numerical information from the control terminal, sufficient to activate the primary telephone system; and (c) Provide and receive supervisory control signallying indicating completion and release of calls to and from subscribers, in the primary system and the radio switched network, as required.

By definition in the following description, the phrase "two-way trunk" refers only to signalling capability of the circuit; similarly, "one-way trunk" refers only to signalling. A two-way trunk has the capability of receiving signalling from the primary system and passing it to the network central station control terminal, and vice versa. A one-way trunk has the limited capability of providing signalling facilities in one direction only.

In order to identify a called subscriber in the radio switched network, it is necessary to obtain a number of digits from the primary telephone system. The required number of digits depends on the capacity for which the radio network is equipped and is a power of ten. For example, if the radio network in operation has capacity of one hundred subscribers, two digits are required ($10^2 = 100$); similarly, if the network has a capacity of one thousand subscribers, three digits are required ($10^3 = 1000$). The required digits will be the least significant digits of the called number. For the sake of simplicity, the following explanation is based on a one thousand subscriber capacity with a three-digit requirement. Various supervisory signalling schemes may be employed in the network; however, for the sake of simplicity "loop seize" and "reversed battery" are used in the network description. The derivation of trunks may vary considerably from system to system application. Thus, for purposes of the following description, the commonly used "business trunk" derivation from an end office (Class five office or equivalent) is employed.

FIG. 9 illustrates the trunk derivation as related to a ten thousand line step-by-step exchange. The trunk provided is in two physical halves 910 and 911. Four digits are provided on incoming trunk 901. Three digits are derived from the required level on the first selector 902 and are passed on line 907 to selector 903. Two digits are derived from the required level on selector 903 and passed on line 908 to selector 904. One digit is derived from the required level on selector 904 and passed on line 909 to output selector 905 from which the appropriate digit may be derived at the required level. The half trunk 910 is a one-way outgoing (with respect to the central office) trunk. The half trunk 911 is actually a one-way incoming subscriber loop. This circuit cannot provide ringing current from the exchange to the interconnecting equipment. Both half trunks are normally 2-wire circuits and thus require hybrid transformers for normal operation.

Outgoing trunk 910 is used by the primary telephone system to seize the central radio station control terminal interface equipment in response to a call originated within the primary system. Conversely, the central control terminal seizes the incoming half trunk 911 when a call is originated by a network subscriber to a primary system subscriber. Interconnection with "T" carrier systems is possible; also provision can be made to accommodate Common Channel Inter-Office Signalling.

II. Switched Network Signalling

A. General

It is to be understood that many signalling formats are useful in the present system; however, a particular format is described herein for purposes of example only. The following paragraphs describe the signalling applied to an analog system; the signalling required for a digital communications system varies somewhat.

B. Radio Baseband Sub-division

For the sake of simplicity, a currently available radio channel with a 3000 Hz radio baseband is used as the basis for the system description. FIGS. 10*a* and 10*b* illustrates the sub-division of the 3000 Hz central radio station baseband for the transmit and receive frequencies, respectively, constituting a duplex radio channel. The transmit and receive configurations are reversed for the radio subscriber stations. The 3000 Hz channel is divided into three sub-channels in both the transmit and receive basebands. The speech channels 1001 and 1007 occupy the frequencies from 300 Hz to 2700 Hz. Two signalling sub-channels 1003 and 1009 occupy the frequencies from 2700 Hz to 3000 Hz. Another pair of signalling subchannels 1002 and 1008 occupy from 0 to 300 Hz. The 2000 Hz idle marker tone 1005 is present in the transmit baseband and only when the channel is not being used for speech communications. The idle marker is also present in the speech channel of the radio subscriber stations but is not transmitted to the central radio station; rather, it is only transmitted to other radio subscriber stations in tandem.

C. Signalling Tones

With reference to FIGS. 10a and 10b, the following tone frequencies are used for signalling and call supervision:

| Transmit Baseband | |
|---|---|
| Tone 1003 Master Synchronization: | 6.8 bps, FSK, 73–93 Hz |
| Tone 1004 Call Supervisory Tone: | on/off, 207 Hz |
| Tone 1005 Idle Marker Tone: | on/off, 2000 Hz |
| Tone 1006 System Control Signalling: | 150 bps, FSK, 2775–2925 Hz |
| Receive Band | |
| Tone 1010 Dialed Digit Signalling: | 8 bps, FSK, 73–94 Hz |
| Tone 1011 Call Supervisory Tone: | on/off, 207 Hz |
| Tone 1012 Call Data Signalling: | 150 bps, FSK, 2775–2925 Hz |

The call supervisory tones are switched on and off as required to indicate the subscriber hook switch conditions in both directions. The dialed digit signalling is only present when dialing is taking place; at other times it is switched off. All other listed tones are continuously on. When radio subscriber stations are configured as repeaters only, communication in the speech channels 1001 and 1007 is repeated. On the other hand, all signalling is detected and regenerated by all radio subscriber stations. This enables the system to employ longer total signalling paths with many repeater stations for call set-up operations, resulting in relatively shorter speech paths.

D. Sub-audio Signalling

The use of a sub-audio channel from 0 to 300 Hz permits the use of slow speed signalling without interruption of or interference with the speech channel. The master synchronization signal 1003 is equal to the baud rate (150 bps) of the system control signalling 1006, divided by half the message frame length (44/2) in bits, or 150/22=6.8 bps. Thus, each message frame may be synchronized with a positive transition of the master synchronization signal. The negative transition takes place at mid-frame.

The supervisory tone 1004 and 1011 corresponds to a subscriber off-hook signal and, therefore, is on only when the subscriber's telephone instrument is in use. It should be noted that the supervisory tone may be used in the reverse manner, being present when the instrument is on-hook. This method of supervision has some practical advantages regarding intermodulation products and the required baseband filter rejection. The former method is the one used in the particular system described herein.

The dialed digit signalling 1010, in FIG. 10b, is slow speed FSK signalling at 8 bps. All data signalling, including the master synchronization signal 1003 is Non-Return to Zero (NRZ) Signalling. The dialed digit signalling space (binary 0) tone of 93 Hz is only present when dialing is in progress. The digits dialed by the radio subscriber, either by rotary dial or keypad, are converted to Hexadecimal (Hex) binary code for transmission. Thus, each dialed digit has four binary bits; digit 0=decimal 10=Hex 1010.

E. Upper Baseband Sub-Channel

With reference to FIG. 10a, the upper sub-channel 1003 of the radio baseband is used for system control signalling 1006 from the central radio station. As shown in FIG. 10b, the upper sub-channel 1009 is used for call signalling data 1012. In both cases, signalling is by means of Frequency Shift Keying (FSK) at 150 bps with a space (binary 0) tone of 2925 Hz and a mark (binary 1) tone of 2775 Hz.

In the case of signalling from the radio subscriber stations to the central radio station, signals are transmitted only as required. When the signalling channel is not in use, a continuous 2925 Hz space tone is transmitted. This is used to maintain continued FKS receiver lock so that signalling may be resumed at any time without a receive-lock delay. All signalling is synchronous.

The signalling from the central radio station to the radio subscriber stations is continuous and common to all radio channels so that all radio subscriber units receive identical signalling.

F. System Control Signalling Format

Figure 11:
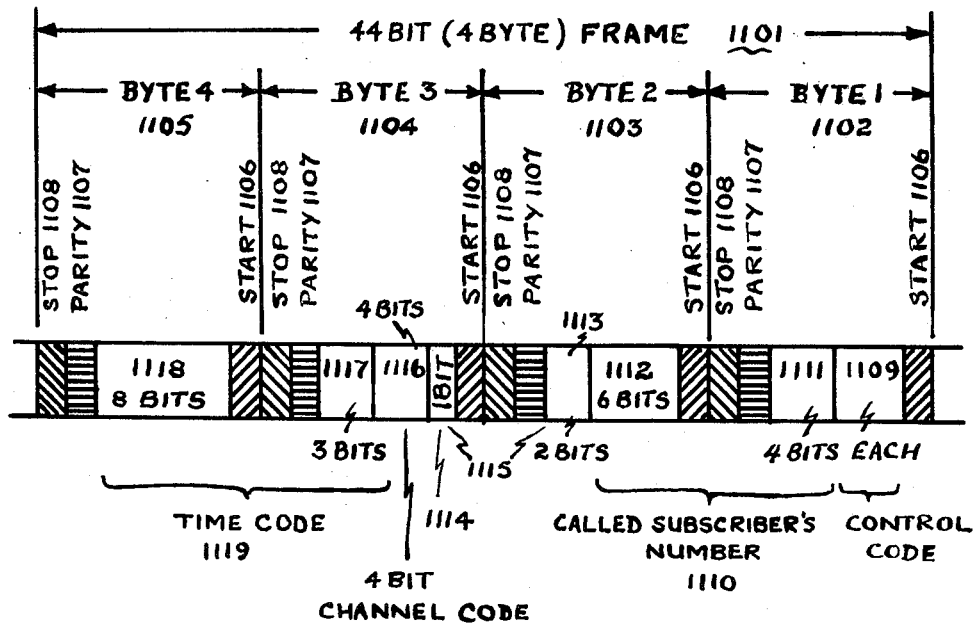
FIG. 11 is a plot of the system control signalling format.

FIG. 11 illustrates the format for system control signalling. Each message consists of a forty-four-bit frame 1101 comprising four eleven-bit bytes 1102, 1103, 1104 and 1105. Each byte contains: eight data bits; one parity bit; one start bit; and one stop bit.

The first four bits 1109 in the first byte 1102 are used as a four-bit control code for message interpretation. This code is defined in Appendix A. The final four bits 1111 in the first byte 1102 plus the first six bits 1112 in the second byte 1103 are used as a ten-bit binary called-subscriber number corresponding to the one thousand subscriber capacity. The start 1106, parity 1107, and stop 1108, bits are self-explanatory. As two subscriber telephone instruments, each having a unique telephone number, may be connected to a radio subscriber station responds to either code. The last two bits 1113 in the second byte 1103, plus the first bit 1114 in the third byte 1104, form a three-bit channel code 1115. This code relates to the radio channels used by the radio subscriber station transceiver which normally communicates with other radio subscriber stations in transmitting information in a direction away from the central radio station. The following four bits 1116 are also a channel code, but relate to the other radio subscriber station transceiver which normally transmits towards the central radio station. The final three bits 1117 in the third byte 1104, and all eight bits 1118 in the fourth byte 1105, are used together as an eleven-bit time code 1119. The eleven-bit code is the binary representation of the one thousand four hundred forty minutes in a twenty four hour a day. Frequent communications between the central radio station and radio subscriber stations removes the necessity for a date code. The time code is used by the radio subscriber station in conjunction with the traffic data facility when reporting call attempts.

G. Call-Data Signalling Format

Figure 12:
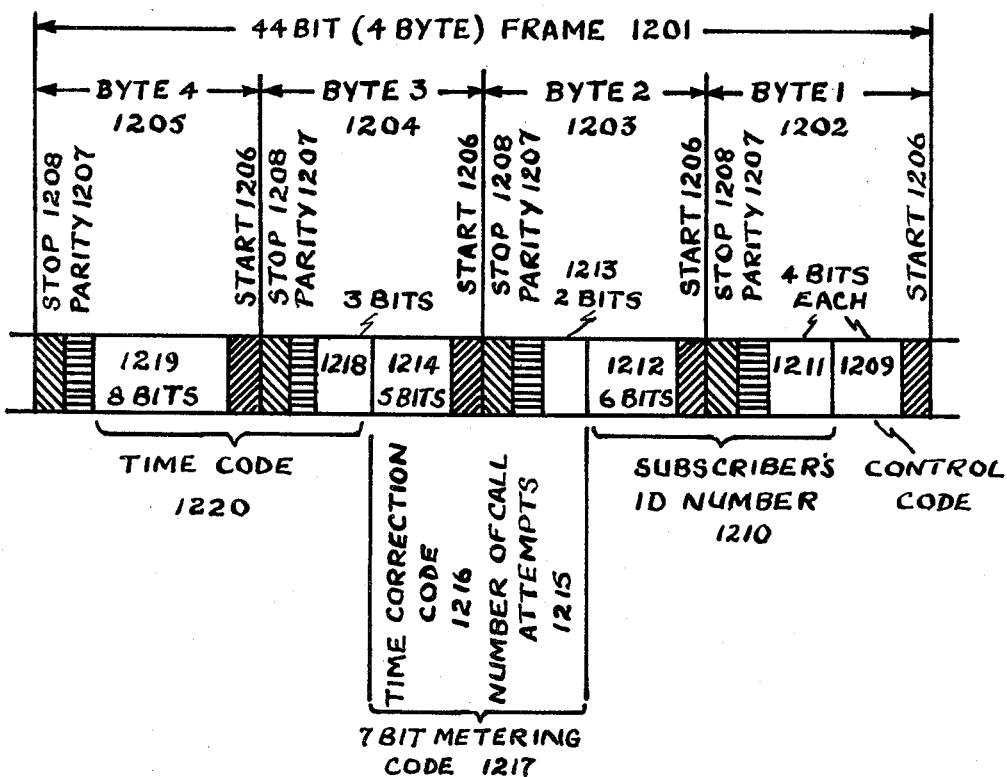
FIG. 12 is a plot of the call data signalling format.

The call-data signalling frame 1201 transmitted by the radio subscriber stations to the central radio station, illustrated in FIG. 12, is similar in format to the system control signalling, FIG. 11, described in the foregoing. The first four bits 1209 of the first byte 1202 are used as a four-bit control code for message interpretation. This code is defined in Appendix B. The final four bits 1211 of the first byte 1202, and the first six bits 1212 of the second byte 1203, constitute a ten-bit binary number which is used as the subscriber's I.D. number 1210.

The final two bits 1213 of the second byte 1203 indicate the number of call attempts 1215 when used in conjunction with the five-bit time correction code 1216. A total of four call attempts can be stored for transmission by the radio subscriber station. The time code 1220 indicates the time when one of the attempts took place. The five-bit time correction code 1216, when added to the eleven bit time code 1220, indicates the time the second attempt took place. A second complete forty-four bit frame 1201 is required if details of more than two attempts must be transmitted. The second frame would have the same format as the first. The time code 1220 includes the next three bits of the third byte 1204 and the eight bits of the fourth byte 1205. The time code would be updated automatically by the subscriber station for the second frame by means of simple addition of the elapsed time, in minutes, as calculated by the subscriber station for the third attempt referenced to the time code applicable to the first attempt. By this method, each pair of call attempts reported may take place up to thirty-two minutes apart. The elapsed time between the second and third attempt, i.e., between the first and second pair of attempts, is limited only by the size of the register used for elapsed time counting. The last two bits 1213 of the second byte 1203 and the first five bits 1214 of the third byte 1204 may alternately be used as a seven-bit metering code 1217. In this case, the elapsed time is accumulated by the radio subscriber station from the time the call is completed (called subscriber answers by removing the telephone handset off-hook) to call termination (either subscriber replaces their telephone handset on-hook). Local metering is required only for network subscriber-to-network subscriber calls, wherein the central radio station radio channels are not employed for communication. Such calls are always set up using the central radio station for system configuration and signalling; therefore, the fact that a call has been attempted is always registered by the central control terminal. On termination of a completed call, the necessary billing information is transmitted to the central radio station control terminal; thus, the call data for that specific call is completed in memory. It will be seen, therefore, that a time code is not required in the local metering message.

The final three bits 1218 of the third byte 1204 and all eight bits 1219 of the fourth byte 1205 comprise an eleven-bit time code 1220 as described in the foregoing.

III. System Configuration and Numbering Plan

A. General

Figure 13:
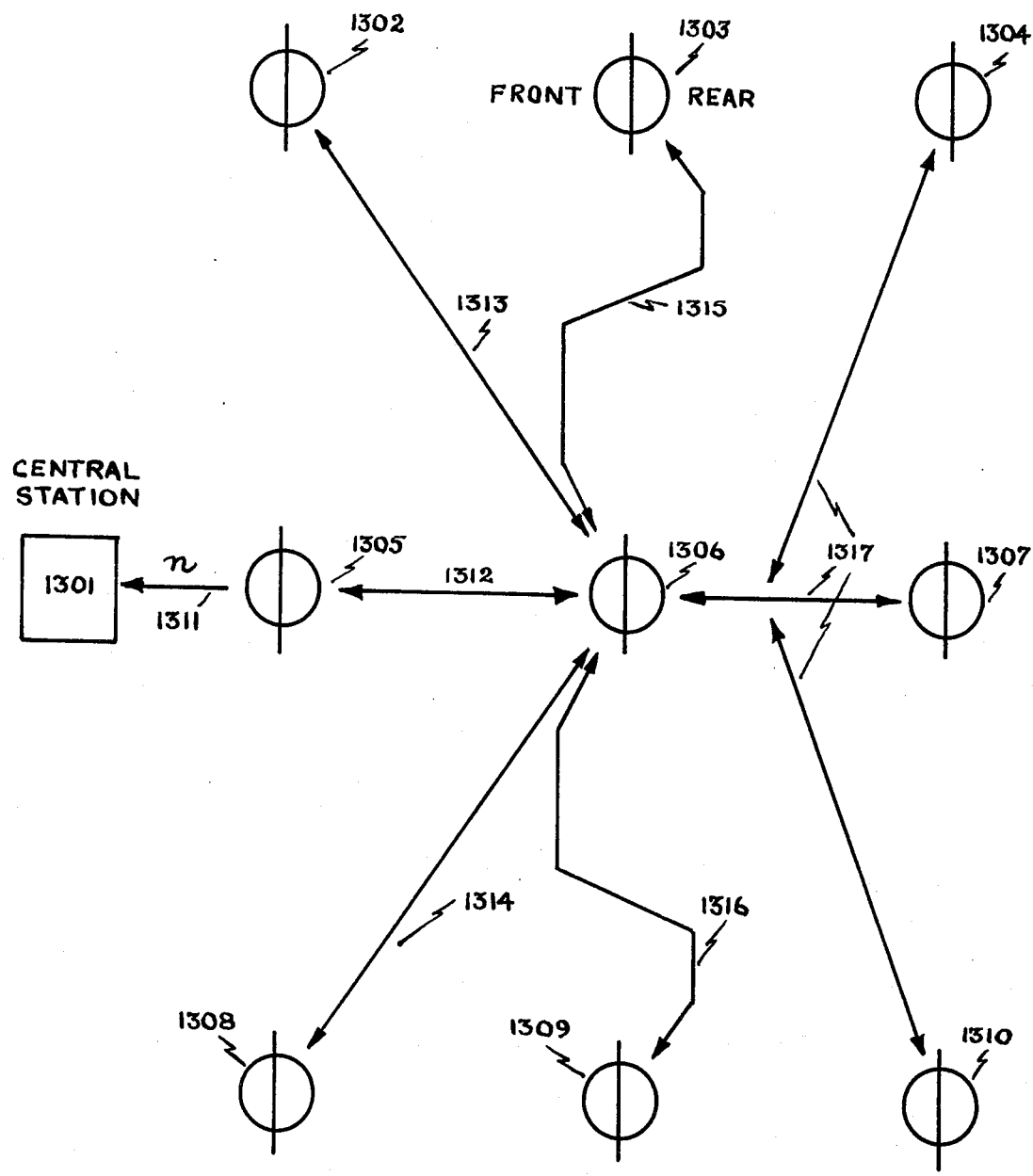
FIG. 13 is a diagram of the radio channel plan for primary channels.

FIG. 13 illustrates a hypothetical switched network configuration. Each of the radio subscriber stations 1302-1310 serves two discrete telephone subscriber loops, each of which may have a unique network subscriber telephone number. In order to provide maximum flexibility to the system, it is necessary to permit the telephone numbers to be allocated on a random basis. Furthermore, in order to both minimize the number of radio channels required in the system and to simplify the control requirements, it is necessary to form an orderly relationship between stations and channel use.

B. Radio Channel Requirements

Referring to FIG. 13, each radio subscriber station 1302-1310 has two duplex radio units which, for the sake of explanation, are called "front" and "rear". The front radio unit is on the left of each radio subscriber station 1302 through 1310, and the rear radio unit is on the right, as viewed in FIG. 13. FIG. 13 illustrates the minimum number of radio channels required for switched communications. The five channels 1312 through 1316 are assigned to the front radio transceiver of radio subscriber station 1306, and a single radio channel 1317 is assigned to the rear radio transceiver. These six channels permit selective communication with each of the eight adjacent radio subscriber stations. Radio subscriber station 1306 is typical of any station which does not communicate directly with the central radio station 1301. Radio subscriber stations 1302, 1305 and 1308 are each equipped with n channels on the front side, where n is equal to the number of communication channels employed by the central radio station. The radio channel 1312 used for communication between radio subscriber stations 1306 and 1305 is also used by station 1305 for communication with stations 1303 and 1309 on a selective basis. Similarly, channels 1313 and 1314 are used by radio subscriber stations 1302 and 1308, respectively, for communication with stations 1303 and 1309 and other units.

Figure 14:
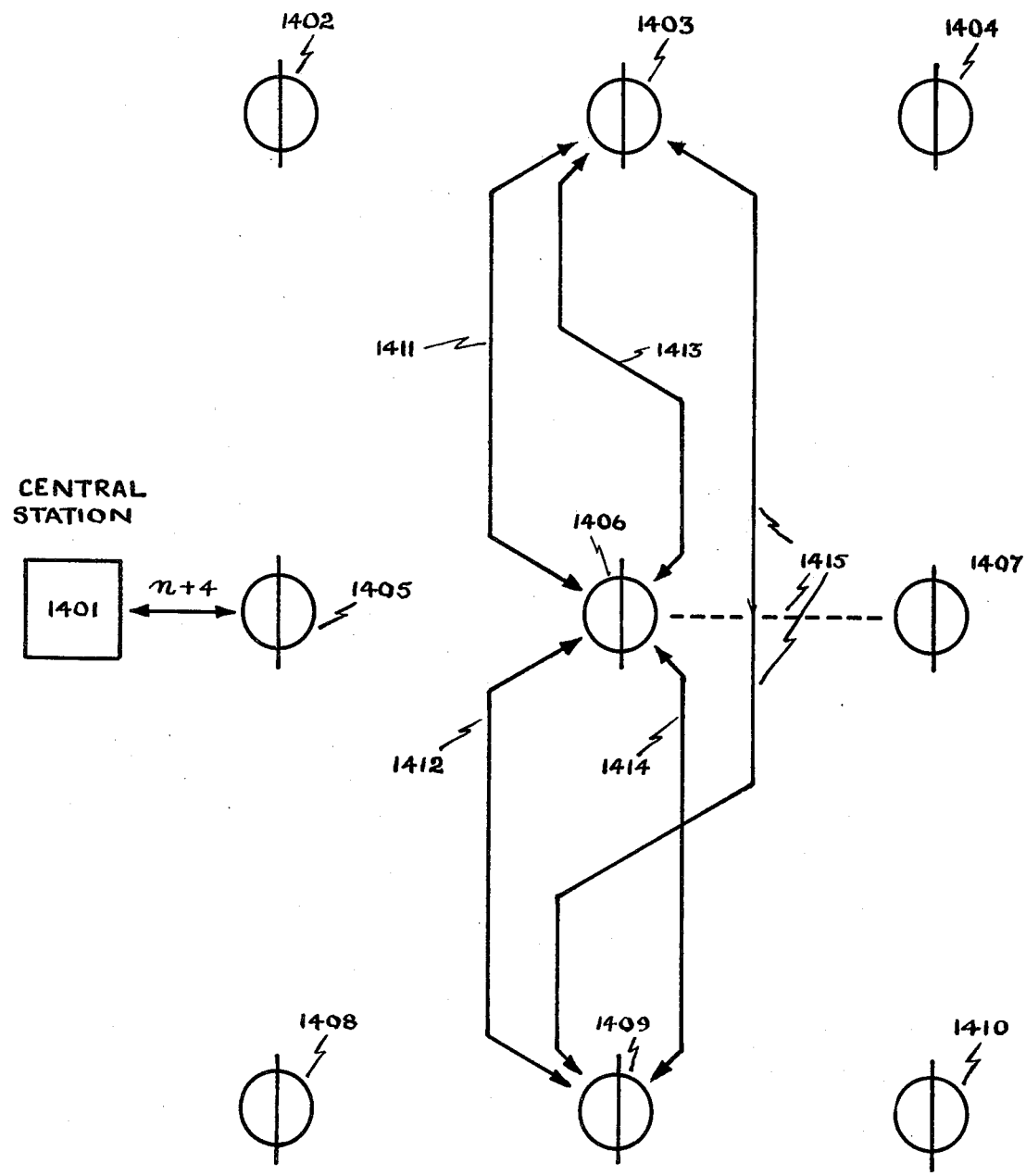
FIG. 14 is a diagram of the radio channel plan for secondary channels.

FIG. 14 illustrates the minimum number of additional channels required by each radio subscriber station in order to permit further flexibility in communications when one channel from either the front or rear of a station is in use by a subscriber served by that station. It will be seen, therefore, that the total number of channels required by any radio subscriber station similar to station 1306 of FIG. 13 is ten for reasonable communication flexibility. Radio channel 1415 of FIG. 14 corresponds to the channel 1317 of FIG. 13. Radio subscriber stations 1402, 1405 and 1408 adjacent central radio station 1401 are equipped with n+4 channels on the front side. These comprise n channels allocated to the central radio station 1401, two channels similar in function to channels 1411 and 1412 but of different frequencies, and two channels of similar function to channels 1315 and 1316 of FIG. 13, but again of different frequencies. It should be noted that further channels may be added for even greater flexibility but are not essential for operation of the system.

IV. Call Routing and System Configuration

A. General

As it is most desirable to be able to assign the radio telephone subscriber numbers on a random basis, a radio subscriber station location plan is used for system configuration. If such a plan was not employed, it would be necessary to use a large alterable memory in the central radio control terminal which would list all adjacent stations, each with two telephone numbers for each network subscriber telephone number. In a one thousand subscriber system, this would require one hundred sixty bits (10-bit binary number for each subscriber), plus twenty-four bits for relative location of each adjacent station, plus at least three control bits for each subscriber, making a minimum total of a $187 \times 1000 = 187,000$-bit memory. Furthermore, the program required for call routing selection would be extremely complex and lengthy and thus totally inappropriate for microprocessor application.

Figure 15:
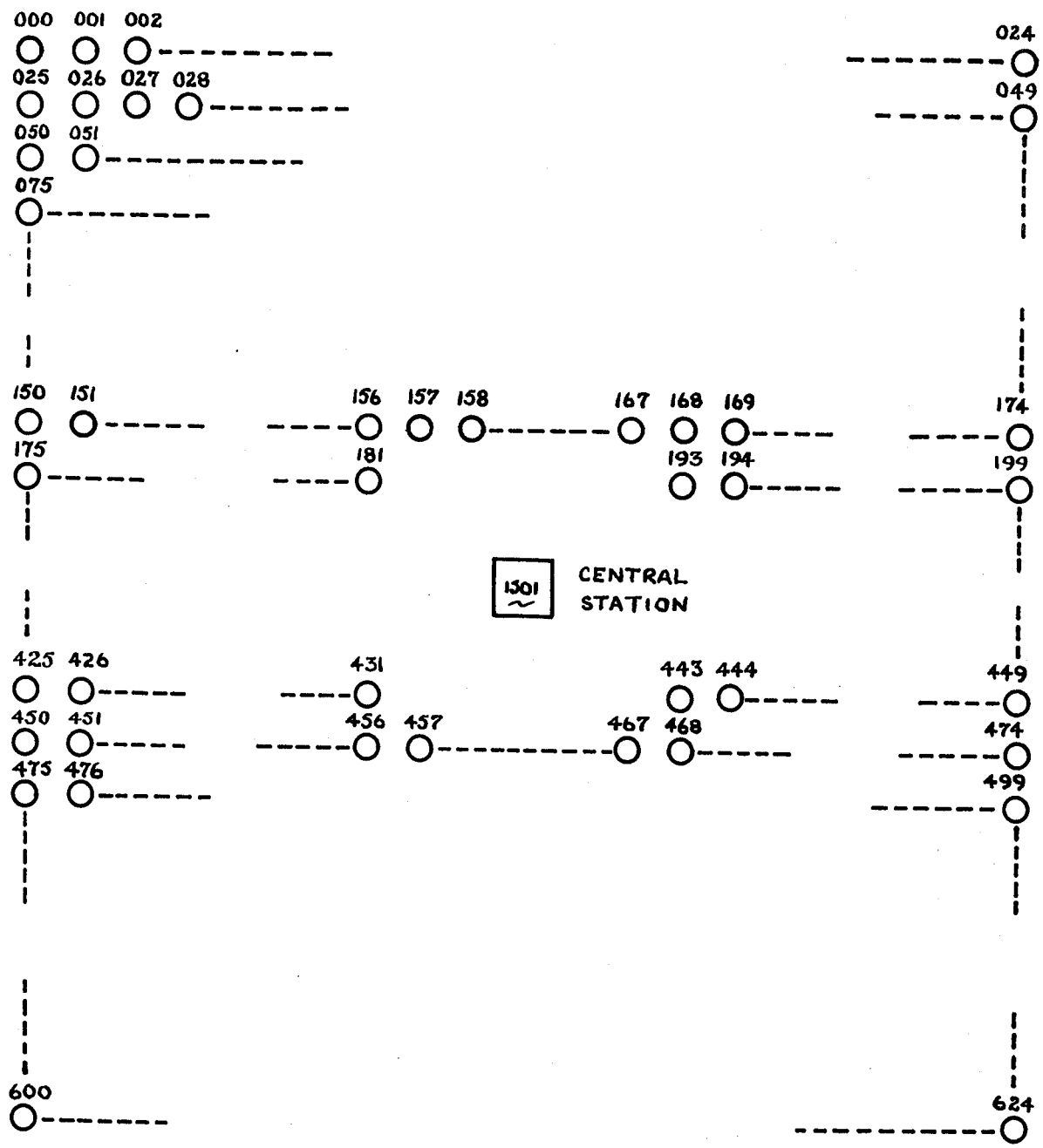
FIG. 15 is a diagram of the radio subscriber station location plan.

The method used in the system herein described employs a radio subscriber station location plan as diagrammatically shown in FIG. 15. This configuration is symetrical and provides locations for five hundred four radio subscriber stations (total capacity 1008 network subscribers). The configuration need not of course be square, but, may take any other symmetrical form. The radio subscriber stations are arranged in twenty-five rows of twenty-five columns. Eleven rows of eleven columns are omitted from the center of the plan so that 144 radio subscriber units have direct access to the central radio station 1501. Each radio subscriber station is assigned a location number starting with the unit at the top left, which is assigned 000, and ending with the station at the bottom right-hand side of the plan, which is assigned number 624. Each of rows one through seven contains twenty-five radio subscriber units similar to row one. The eighth row, commencing with location 175, is continuous through radio station location 181; however, the following eleven locations are omitted, the next location being 193. The following ten rows are similarly arranged with the middle eleven locations omitted. The complete row again starts with location 450. All subsequent rows are complete through location 624. It will be seen that each radio subscriber location has a fixed numerical relationship with respect to all adjacent radio subscriber locations.

Figure 16:
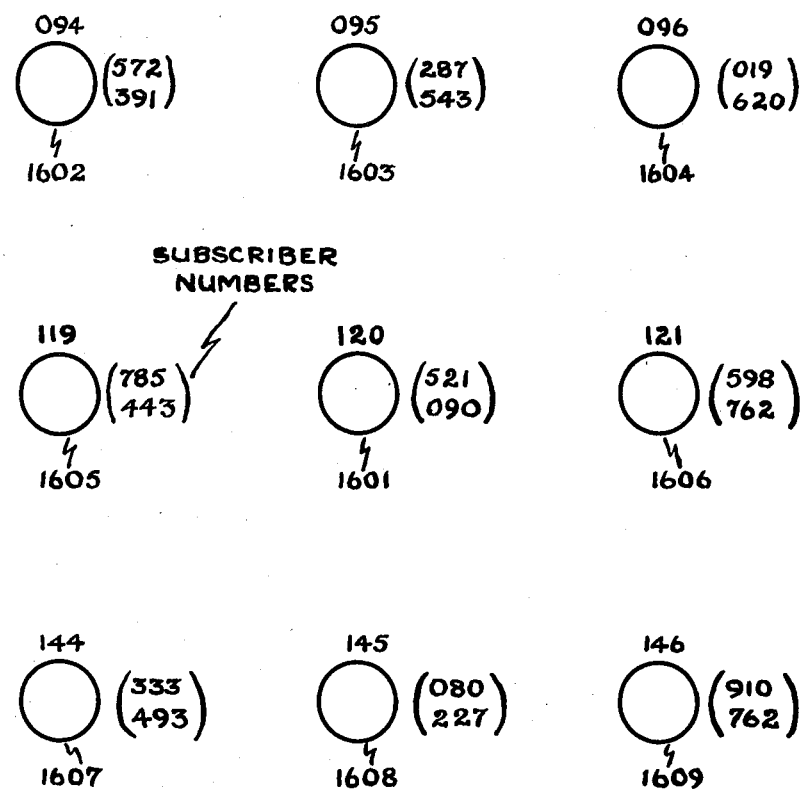
FIG. 16 is a diagram of the radio subscriber location relationship.

FIG. 16 shows a small section of the overall radio subscriber location plan from FIG. 15. Radio subscriber station 1601 is in location 120, and the adjacent locations have the following numerical relationship:

| Drawing Detail | Location No. | Relationship (120± Location No.) |
| --- | --- | --- |
| 1602 | 094 | −26 |
| 1603 | 095 | −25 |
| 1604 | 096 | −24 |
| 1605 | 119 | −1 |
| 1606 | 121 | +1 |
| 1607 | 144 | +24 |
| 1608 | 145 | +25 |
| 1609 | 146 | +26 |

All other radio subscriber stations have similar relationships with their adjacent units with which they are able to communicate. As there will always be eight or less adjacent stations, it is then possible to refer to the numerical relationships by numbers 0 through 7, provided they are always viewed in the same way.

FIG. 16 also shows, in parentheses, possible random assignments of subscriber telephone numbers to each radio subscriber station. The final three digits of each number for the two possible subscriber loops are shown in parenthesis. The preceding digits of each subscriber number is always the same due to their derivation explained in the foregoing.

B. Basic Routing Sequence

Figure 17:
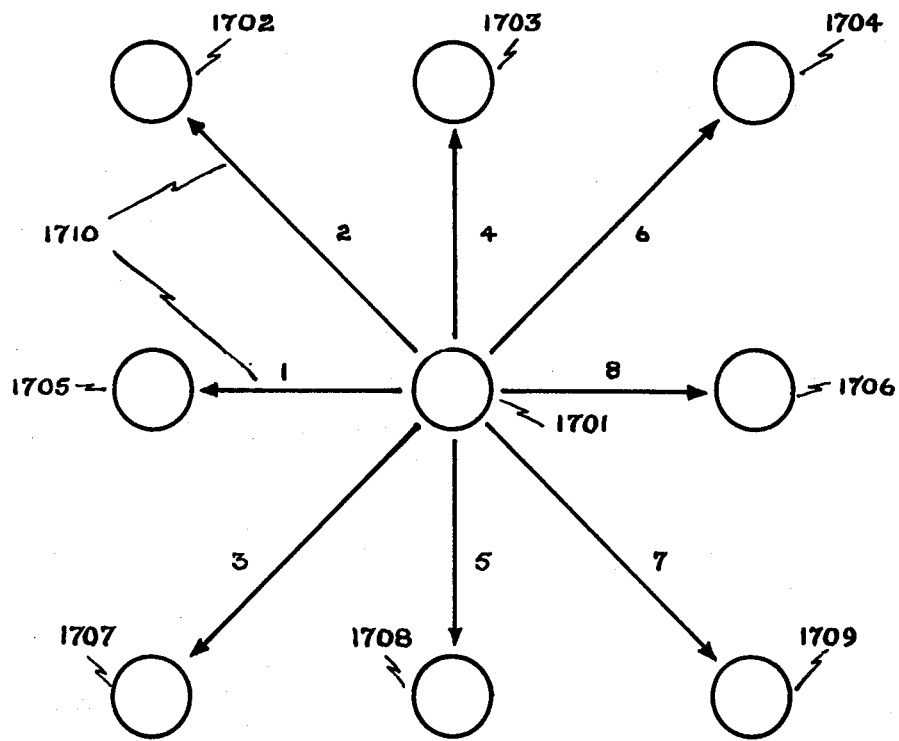
FIG. 17 is a diagram of the adjacent station preference plan.

FIG. 17 illustrates a radio subscriber station 1701 with eight adjacent radio subscriber stations 1702 through 1709. The possible call routes 1710 via adjacent radio subscriber stations are numbered 1 through 8 in order of preference for that particular radio subscriber station 1701. This assumes that the central radio station lies to the left of radio subscriber stations 1701 and 1705. Depending where the central radio station is located with respect to the radio subscriber station in question, the diagram in FIG. 17 may be rotated as required so that call route 1 provides the most expeditious direct communications path with the central radio station. It is not necessary to list the radio channels applicable to each route as, by reference to FIG. 13, it may be seen that sufficient primary channels are provided for selection of any one of the eight adjacent radio subscriber stations as a correspondent.

Figure 18:
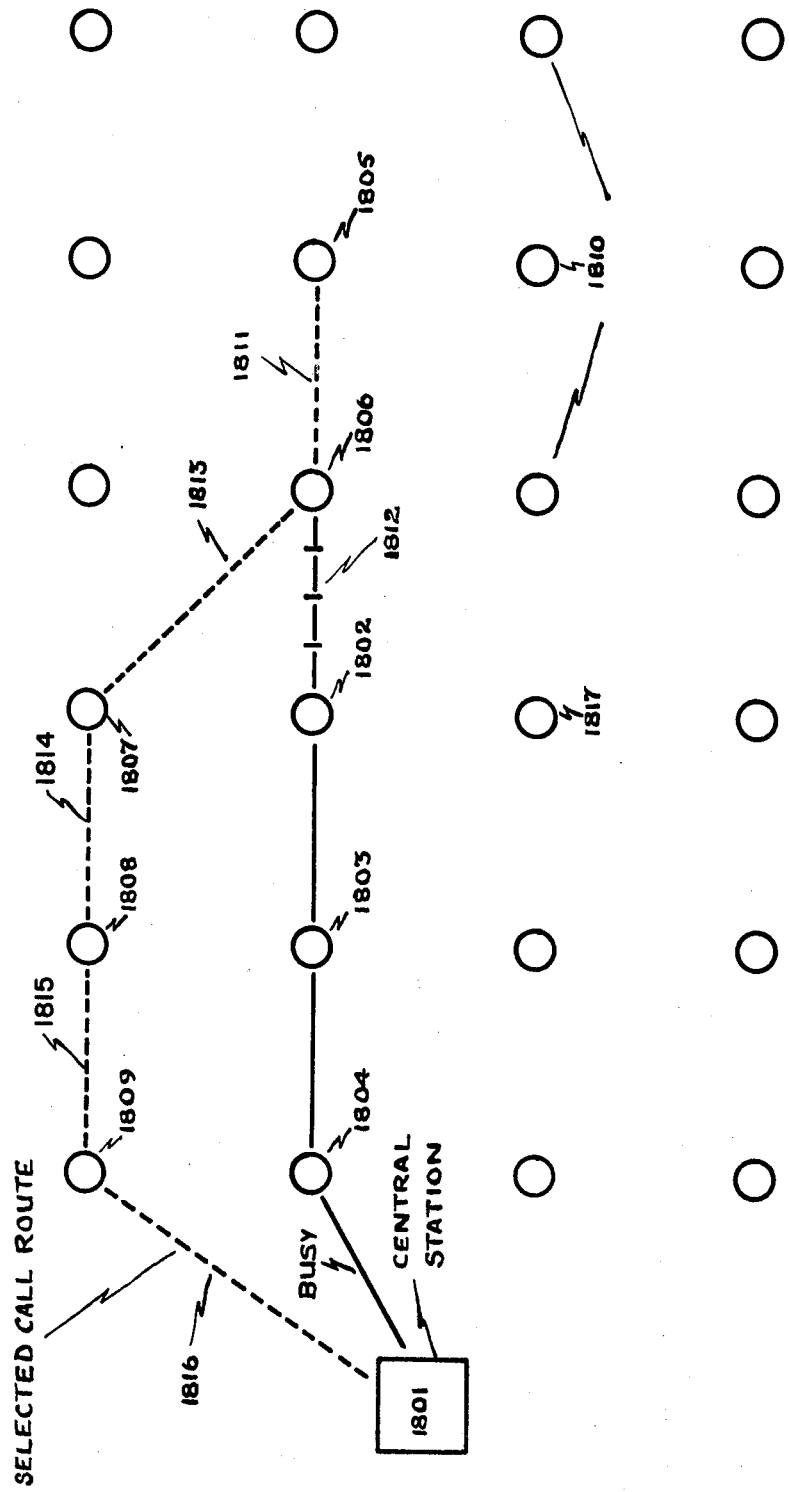
FIG. 18 is a diagram of call routing.

FIG. 18 shows a section of a typical network wherein radio subscriber station 1805 is to be used for a call to or from one of the network subscribers it serves. Radio subscriber station 1806 is first tested to see if it is busy, as this is the preferred route for the call. Assuming station 1806 is not busy, the appropriate channel is selected for communication with this unit which acts as a repeater. The first preferred route from station 1806 is via station 1802; however, station 1802 is assumed for this discussion to be busy and may not be used. Therefore, the second route preference is selected which is via radio subscriber station 1807. Radio subscriber station 1807 is tested and, if not busy, as assumed here, the appropriate channel 1813 selected. Communication from station 1807 may proceed through stations 1808 and 1809 on a first preference basis using channels 1814 and 1815. The communication channel 1816 between the radio subscriber station 1809 and the central radio station 1801 is selected by the central radio station control terminal in conjunction with the telephone trunk which will be used for the call. After selection of subscriber radio station 1807, if one of the other two stations 1808 and 1809 is busy, the call routing is reconstructed from station 1806, possibly using radio subscriber station 1817.

Call routing from subscriber station to subscriber station is performed in a somewhat different manner and is explained fully below.

C. Call Routing and Configuration Memory

Figure 19A:
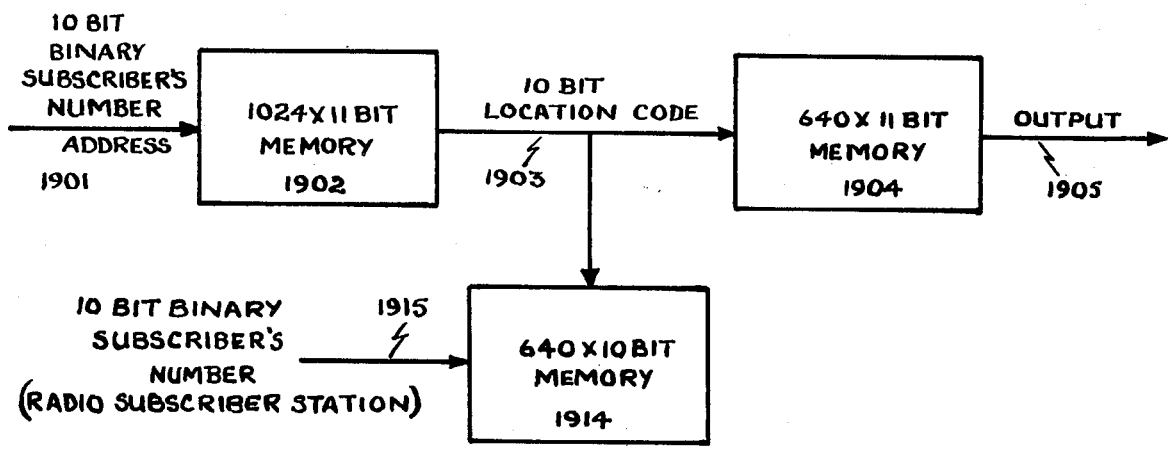
FIGS. 19a, 19b and 19c are diagrams of the call routing and configuration memory.

FIG. 19a illustrates the call routing and configuration memory which is part of the common control equipment of the central control terminal. The complete memory system consists of three alterable memories 1902, 1904 and 1914. Memory 1902 comprises 1024×11-bit words shown as element 1906 in FIG. 19b. Bit 0 is used to mark the subscriber busy when the bit is set (i.e. binary one). Bits 1 through 10 are a 10-bit radio subscriber unit location code in accordance with the arrangement of FIG. 15. The memory is addressed by a 10-bit binary code which is equivalent to the network subscriber telephone number. The ten-bit location code is written into the memory when the telephone number is assigned to the subscriber. Thus, each location code is present in two different words throughout the memory. The location codes remain in the memory and are not changed by normal operation of the system, only by external programming.

The second memory 1904 is a 640×11-bit alterable memory. As shown in FIG. 19c, each of the 640 eleven-bit words comprises a two-bit control code which is encoded during system operation as follows:

TABLE B

| Bit | 1 | 0 | Meaning |
| --- | --- | --- | --- |
| | 0 | 0 | Idle |
| | 0 | 1 | Rear Busy |
| | 1 | 0 | Front Busy |

TABLE B-continued

| Bit 1 | 0 | Meaning |
|---|---|---|
| 1 | 1 | All Busy |

The following three bits, 2, 3 and 4, comprise an orientation code, which may be understood by reference to FIG. 17. As described above the call routing diagram of FIG. 17 may be rotated to any position in accordance with the required direction of the preferred routing from the specific radio subscriber station. If the orientation shown in FIG. 17 is taken as octal code 000, then by rotating the preferred routing counterclockwise through 45°, choice 1 now uses radio subscriber station 1707 as correspondent and the other call route choices shift similarly. This orientation may then be referred to by octal code 001. Further orientations may be shown by codes 010 through 111. The octal orientation code is set by external programming and is not changed during normal operation of the system.

The next three bits 5, 6 and 7 in the eleven-bit word are a three-bit route code. The route code is an octal code 000 through 111 which refers directly to the route selected in accordance with the preference diagram of FIG. 17. This code is set and reset at various times, as required during normal operation of the system.

By reference to FIG. 16, which shows a small section of the overall plan of FIG. 15, it may be seen that a constant numerical relationship exists for any symmetrical system configuration between adjacent radio subscriber station codes, as previously described. If the relationship factors are listed in accordance with the routing preference sequence and orientation shown in FIG. 17, the following table applies when using the location codes in FIG. 16.

TABLE C

| Preference | Ref. Number | Location Code | Relationship Factor | Octal Route Code |
|---|---|---|---|---|
| 1 | 1605 | 119 | −1 | 000 |
| 2 | 1602 | 094 | −26 | 001 |
| 3 | 1607 | 144 | +24 | 010 |
| 4 | 1603 | 095 | −25 | 011 |
| 5 | 1608 | 145 | +25 | 100 |
| 6 | 1604 | 096 | −24 | 101 |
| 7 | 1609 | 146 | +26 | 110 |
| 8 | 1606 | 121 | +1 | 111 |

Once the relationship factors are established for any given network configuration, they do not change. However, their order in sequence will change according to the orientation of the route preference as per FIG. 17. Table II shows the various factor arrangements in accordance with each orientation code.

TABLE D

| Orientation Codes | | | | | | | | Route Code | Primary Channel Code |
|---|---|---|---|---|---|---|---|---|---|
| 000 | 001 | 010 | 011 | 100 | 101 | 110 | 111 | | |
| −1 | +24 | +25 | +26 | +1 | −24 | −25 | −26 | 000 | 000 |
| −26 | −1 | +24 | +25 | +26 | +1 | −24 | −1 | 001 | 001 |
| +24 | +25 | +26 | +1 | −24 | −25 | −26 | −25 | 010 | 010 |
| −25 | −26 | −1 | +24 | +25 | +26 | +1 | +24 | 011 | 011 |
| +25 | +26 | +1 | −24 | −25 | −26 | −1 | −24 | 100 | 100 |
| −24 | −25 | −26 | −1 | +24 | +25 | +26 | +25 | 101 | 101 |
| +26 | +1 | −24 | −25 | −26 | −1 | +24 | +1 | 110 | 101 |
| +1 | −24 | −25 | −26 | −1 | +24 | +25 | +26 | 111 | 101 |

The contents of Table C are stored in the program memory of the common control unit of the central control terminal where they remain unchanged unless the complete system configuration plan is changed.

When Bit 8 of FIG. 19c is set, it indicates that the particular radio subscriber station may communicate directly with the central radio station. This bit is set by external programming and remains unchanged by normal system operation.

A third memory 1914 is used only for reverse translation of 10-bit location codes into 10-bit subscriber numbers. Only one subscriber number per radio subscriber station is required for identification; thus the memory size is limited to 640×10 bits.

Bits 9 and 10 form a two-bit preference reservation code. These two bits are used when the particular radio subscriber station represented by the eleven-bit word is busy, thus denying an adjacent radio subscriber station its primary call routing choice for another call in progress. As a result, the latter radio subscriber station uses an alternate call routing choice but marks the prime route unit memory byte. Thus, if the first radio subscriber station returns to an idle condition while the second call is still in progress, rerouting of the latter is possible. The two-bit code refers to the orientation of the would-be correspondent radio subscriber station relative to the station represented by the memory byte. Inasmuch as adjacent radio subscriber stations may only vary their orientation through one 45° step relative to adjacent stations, a maximum of three units have the possibility of referring to any other unit as a primary choice. Hence, the two-bit code is sufficient to represent a non-marked state or any of three radio subscriber stations. The preference reservation code is computed as follows:

a = The orientation code of the radio subscriber station to be used as a repeater; b = The orientation code of the radio subscriber station requiring the service; and p = The preference reservation code.
Then:

$$(b+1)-(a-1)=p, \tag{A}$$

except where: a=0 and b=7, in which case p=1, and where a=7 and b=0, in which case p=3.

The controlling microprocessor is programmed to solve the simple equation except for the two stated special combinations for which the solutions are tabulated and stored in the program memory.

D. Memory Operation

Figure 19B:
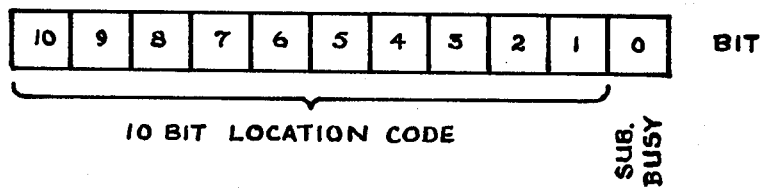
Figure 19C:
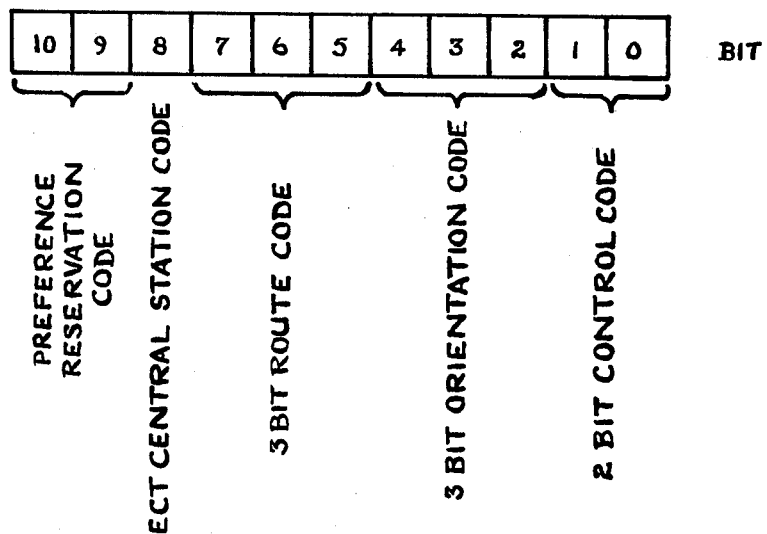
Figure 20:
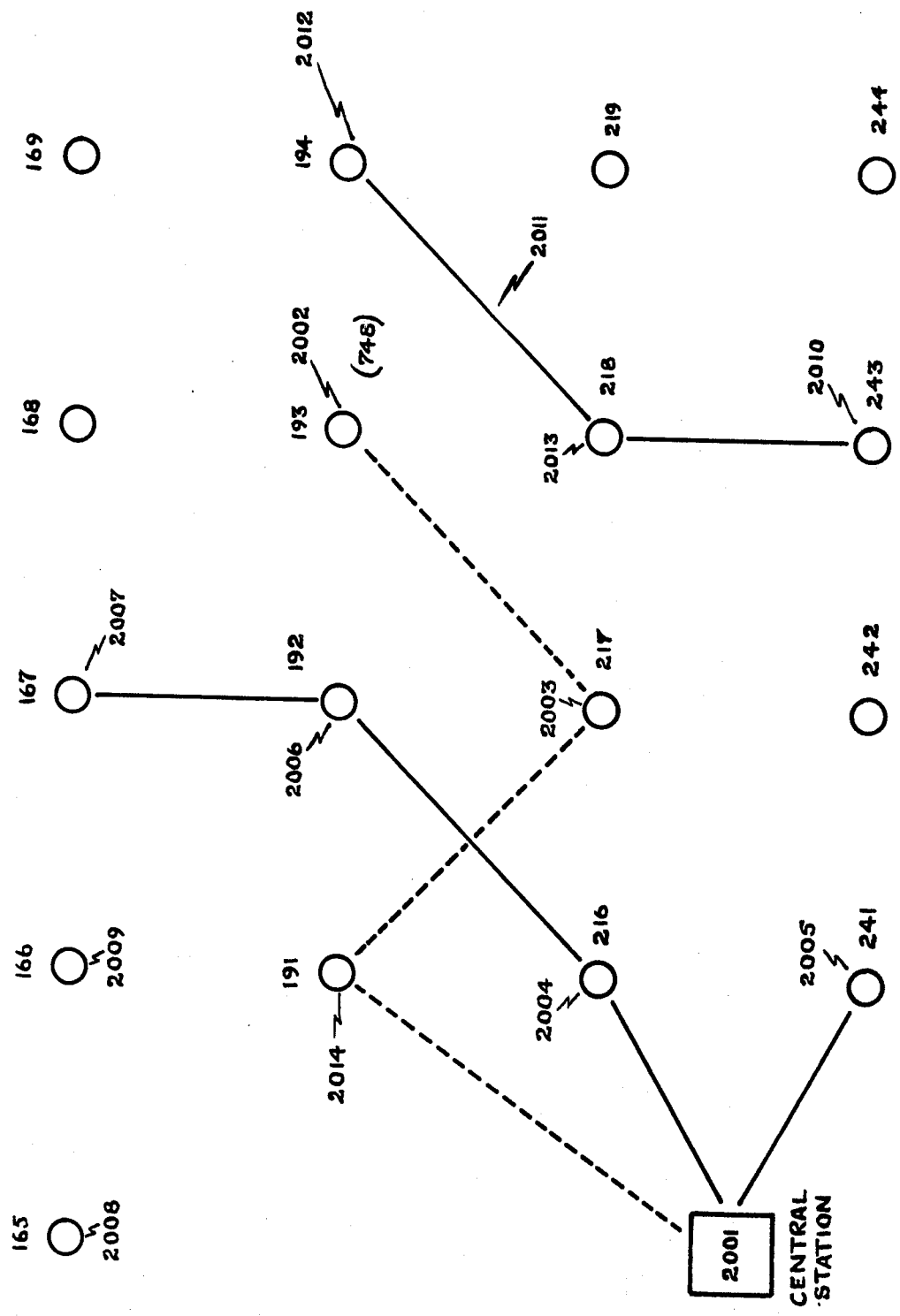
FIG. 20 is a diagram of a call routing example.

The call routing and configuration memory of FIG. 19 is microprocessor-controlled as part of the central control terminal common control equipment. FIG. 20 illustrates a small section of a typical system. The radio subscriber stations 2007, 2006, 2004 and 2005 are shown busy with calls via the central radio station 2001. A call from the primary telephone system is assumed to have been originated for a subscriber number (748), connected to radio subscriber station 2002. Automatic call routing and system configuration is achieved as follows: The ten-bit binary code equivalent of the subscriber number (748) is applied to the address lines 1901 of the memory 1902 in FIG. 19. An eleven-bit word (FIG. 19b) is read from the memory. Bit 0 is tested to see if the subscriber is busy and, if not, bits 1 through 9 are used to address memory 1904. Bit 0 is set to indicate the subscriber is busy. Bits 1 through 10 of the word from memory 1902 are equivalent to the location code 193 for unit 2020 of FIG. 20. The 10-bit subscriber number is temporarily stored by the microprocessor in its operating memory.

The 11-bit word of FIG. 19c is read from the addressed location in memory 1904. The control code (bits 0, 1) is tested first to see if the radio subscriber station is being used as a repeater, in which case it would not be possible to communicate with the called subscriber except by rerouting the call presently using the station as a repeater. The control code is then tested to see which transceiver of the two at the radio subscriber station is available (idle) for communication. One transceiver may be being used already by one of the subscribers connected to the radio subscriber station. This condition does not prevent the call from being completed but determines only which transceiver, and hence choice of call routing, is used. It is assumed for the sake of this example that both transceivers are idle. Bit 8 of FIG. 19c is tested to see if direct communication is possible with the central radio station 2001 of FIG. 20. Bit 8 is set under the assumed conditions and thus the orientation code (bits 2, 3, 4) is tested. For example, it is assumed that radio subscriber unit 2002 operates with orientation code 001 (in accordance with Table C) stored in the program memory. The code 001 is applied to the stored table and results in a primary choice factor of +24. The microprocessor adds the ten-bit location code 1903 used to address memory 1904 and the factor: $193+(+24)=217$. This result, 217, is the location code of the radio subscriber unit 2003 (FIG. 20). The ten-bit binary equivalent of 217 is used to address the memory 1904. The eleven-bit word (FIG. 19c) is read from the memory location indicated by the address and bits 0 and 1 is tested to ensure that both transceivers are idle so that the radio subscriber unit may be used as a repeater. Memory 1904 is addressed again at memory location 193 and the control code (bits 0 and 1, FIG. 19c) is set to binary 10. The route code (bits 5, 6 and 7) is set to octal 000 and the primary channel code 000, from the stored Table C, is temporarily stored in the operating memory by the microprocessor alongside the equivalent 10-bit binary called subscriber number. Location 217 is addressed in memory 1914 and the ten-bit binary word representing one of the two subscriber telephone numbers assigned to radio subscriber station, 2003 (FIG. 20) is temporarily stored in the microprocessor operating memory. Inasmuch as the orientation of adjacent stations in a practical system never varies by more than 45°, the prime radio channel code 000 will always correspond with channel code 101 on the adjacent station. Therefore, channel code 101 is stored in the rear transceiver storage location alongside the subscriber number (equivalent to location code 217) in the microprocessor operating memory. Location 217 is addressed in memory 1904 and the orientation code 000 (bits 2, 3 and 4 FIG. 19c) is read by the microprocessor and applied to Table C in the program memory. The initial factor produced, $-1$, is added to the location code: $217+(-1)=216$. Location 216 is addressed in memory 1904 and is, under the assumed condition, found to be busy and thus is unsuitable for use as a repeater. Inasmuch as the station 2004, location code 216, was the first choice of station 2003 for use as a repeater, the preference reservation code (bits 9, 10, FIG. 19c) is set. The orientation code of station 2004 is the quantity "a" in the equation and the orientation code of station 2003 is "b" in equation A. Thus, $a=000_8=0_{10}$ and $b=000_8=0_{10}$, therefore, $(b+1)-(a-1)=2$ and $2_{10}=10_4$ and $Z_{14}$. The preference reservation code (bits 9, 10, FIG. 19c) is therefore set to binary "10" in memory 1904. The second choice is read from Table C and added as above $217+(-26)=191$. The ten-bit location code (FIG. 19b) for 191 is applied as an address to memory 1904 as previously described and the eleven-bit control word (FIG. 19c) is read from that memory. Bits 0 and 1 are examined as before and show that both transceivers are idle. Bit 8 is also examined and found to be set, thus indicating that direct communication is possible with the central radio station from this radio subscriber station. Location 217 is addressed in memory 1904 and the control code is set to indicate that both transceivers are busy. The route code (bits 5, 6, 7) is set to octal 001 and the channel codes 001 and 101 are temporarily stored with the binary equivalent of the subscriber number assigned to location 217 in the microprocessor operating memory. Location 191 is addressed in memory 1904 and the control code is set to indicate both transceivers busy, the route code remaining cleared at 000. Location code 191 is used to address memory 1914 which produces a ten-bit binary subscriber number at line 1915 for that location. This number is temporarily stored in memory with channel code 000 in the rear transceiver memory location. The appropriate code for the front transceiver is assigned by the control terminal in accordance with the trunk used. The subscriber numbers and channel codes stored temporarily in the microprocessor are now used to formulate the necessary system control signalling messages to the individual stations in accordance with the format of FIG. 11. The data is also stored in the appropriate traffic data memory location. Once the call has been set up with all radio subscriber stations switched to the correct frequencies, the information temporarily stored in the microprocessor operating memory may be cleared.

When a call is terminated, the various locations in the memory 1904 are cleared. Assuming that the cell between the primary telephone system subscriber and station 2007 is terminated, the following memory operation take place. The radio subscriber number of the previously communicating subscriber connected to station 2007 is used, in ten-bit binary format, to address memory 1902. Bit 0 of the eleven-bit location word (FIG. 19b) is cleared, and bits 1 through 10 are used to address memory 1904. The two-bit control code (bits of FIG. 19c) is cleared. The routing code (bits 5, 6, 7 of FIG. 19c) shows that the third choice was used; thus, it is set to 010, and from the orientation code 001 (bits 2, 3, 4), it may readily be computed (by use of the look up Table C in the program memory which produces the factor +25), that the radio subscriber station 2006 at location 192 was used as the corresponding repeater. Radio subscriber unit 2007 location code 167 added to factor +25, results in location code 192. The route code 1912 is then cleared. The ten-bit binary equivalent of 192 is used to address memory 1904 again. The two-bit control code (bits 0, 1) is reset and the routing (bits 5, 6, 7) and orientation (bits 2, 3 and 4) codes are used to determine that subscriber station 2004 was used as the next repeater. Upon being tested, the preference reservation code (bits 9 and 10) code is found to be set, indicating that the station had direct communication with the central radio station and therefore must be the final repeater station in the call. The location code of the radio subscriber station referred to by the preference reservation code is determined from the following look up Table D, stored in the microprocessor program memory by application of the orientation code.

TABLE E

| Orientation Code | P = 1 | 2 | 3 |
|---|---|---|---|
| 000 | −24 | +1 | +26 |
| 001 | −25 | −24 | +1 |
| 010 | −26 | −25 | −24 |
| 011 | −1 | −26 | −25 |
| 100 | −24 | −1 | −26 |
| 101 | +25 | +24 | −1 |
| 110 | +26 | +25 | +24 |
| 111 | +1 | +26 | +25 |

The factor obtained from the table is added to the location code of the addressed radio subscriber station byte in memory 1904. In this example, 216+(+1)=217. The ten-bit binary Location Code (FIG. 19b) is therefore used to address location 217 in memory 1904. The two-bit control code 1910 shows that station 2003 (location code 217) is still in use. As station 2004 has direct communication facilities with the central radio station, further route testing is not required. Thus, the preference reservation code (bits 9, 10, FIG. 19c) is cleared in memory 1904, location 216, and the necessary channel codes are temporarily stored in the microprocessor memory. Location 217 is addressed in memory 1904 and the route code 1912 set to octal 000. The necessary channel code for the front transceiver is temporarily stored in the microprocessor operating memory. The necessary control signalling messages to stations 2004 and 2003 are formulated to switch both transceivers in station 2004 and the front transceiver in station 2003 to the correct channels for communication. Using the route code (bits 5, 6, 7) as previously described, the radio subscriber station 2006 location is addressed in memory 1904 where the control code is used to address memory 1914 and produce the correct radio subscriber station number so that the necessary disconnect signal may be sent to this station when switching takes place. When all three stations 2003, 2004 and 2006, have been prepared by individual signalling, a channel switch command signal is transmitted by the central radio station. Stations 2003 and 2004 switch channels and station 2006 disconnects simultaneously, thus providing an almost instantaneous change of call routing. The data temporarily stored in the microprocessor operating memory is now cleared.

A network subscriber-to-network subscriber call uses the call routing and configuration memory in FIG. 19a in the following manner. With reference to FIG. 20, assume one subscriber connected to radio subscriber station 2010 wishes to make a call to a subscriber served by radio subscriber station 2012. After the necessary signalling has been completed to originate the call, the subscriber numbers of both the originating party and the called party are applied separately to memory 1902 in ten-bit binary format. Bit 0 of the eleven-bit word (FIG. 19b) which results from the application of the calling subscriber's number is set to mark it busy. This bit is tested to see if it is marked busy. If not, the call may proceed.

The ten-bit location code (FIG. 19b) for each station is processed as follows to determine where each station is relative to the other. This is necessary in order to determine the direction of the call routing with reference specifically to the location codes of suitable radio subscriber station which may be used as repeater stations. A set of simple general equations are applicable for this purpose, as shown below; these equations may be solved by the microprocessor using well-known algorithms.

For any two subscriber stations A and B, where: a is the station location code; n is one less than the number of the horizontal row in which the station is located; L is the number of location codes in a horizontal row in a symmetrical location plan such as that of FIG. 15; v is the number of vertical rows involved in the routing between stations A and B; h is the minimum number of horizontal rows involved in the routing between stations A and B; and d is the minimum number of diagonal connections involved in the routing between stations A and B; then the following equations apply.

| | | |
|---|---|---|
| For station A: | $a_A - n_A L = y_A$. | (1) |
| For station B: | $a_B - n_B L = y_B$. | (2) |
| From equations (1) and (2), where $y_A > y_B$, | | |
| | $(y_A - y_B) + 1 = v$, | (3) |
| or where $y_B > y_A$, | | |
| | $(y_B - y_A) + 1 = v$. | (4) |
| For $n_A > n_B$: | | |
| | $(n_A - n_B) + 1 = h$, | (5) |
| or for $n_B > n_A$, | | |
| | $(n_B - n_A) + 1 = h$. | (6) |
| For $v < h$, $v - 1 = d$, | | (7) |
| and for $v > h$, $h - 1 = d$. | | (8) |

The direction the diagonal must take is determined by the following procedure. The diagonal relational with respect to station A (using the relationship factors of Table A herein above) where $a_A < a_B$, and $y_A > y_B$ is L−1. Conversely, for $a_A < a_B$, and $y_B > y_A$, the diagonal relationship is L+1.

Using the foregoing equations, in the stated example, the system proceeds to route the call from station 2012 to station 2010 as follows. The location code 194 for station 2012 (station A) is applied to equation (1) to yield:

$$y_A = 194 - (7 \times 25) = 19.$$

Likewise, for station 2010 in equation (2):

$$y_B = 243 - (9 \times 25) = 18.$$

Since $y_A$ is greater than $y_B$, equation (3) is used rather than equation (4) to yield:

$$v = (19 - 18) + 1 = 2.$$

From FIG. 20 it is seen that the possible routes between stations 2012 and 2010 must include a minimum of two vertical columns, hence v=2. Since $n_B$ is greater than $n_A$, equation (6) applies, as follows:

$$h = (9 - 7) + 1 = 3.$$

From FIG. 20 it is seen that the possible routes between stations 2012 and 2010 must include a minimum of three horizontal rows, hence h=3.

Since v is smaller than h, the minimum number of diagonal connections required to complete the call is given by equation (7), to wit:

$$d = 2 - 1 = 1$$

The location code for station 2012, 194, is used to address memory 1904 again and the orientation code (bits 2, 3 and 4, FIG. 19c) is tested and found to be 001. Inasmuch as $y_A > y_B$ in the foregoing example, the microprocessor program recognizes that the station 2010 lies to the left of station 2012 and the orientation code for station 2012 results in a front transceiver connection in the correct direction. Therefore, the call is set up progressively starting from station 2012. One diagonal is required; thus, the first choice of routing from station 2012 provides this diagonal connection if it is available. The routing procedure is similar to that previously described. The routing from station 2013 to station 2010 requires a lateral connection of which there are two choices (1413 and 1411, FIG. 14). Inasmuch as the station 2010 is idle, the channel providing a connection similar to connection 1413 of FIG. 14 is selected. By this method the front transceiver of station 2010 remains idle, thus providing easy connection in the direction of the central radio station 2001, if required, by the second telephone subscriber served by the radio subscriber station.

V. Equipment

A. General

All the components and circuit elements used in the system equipment are commonly available from numerous manufacturers. The majority of the components are integrated circuit logic chips and operational amplifiers.

B. Radio Subscriber Unit

Figure 21:
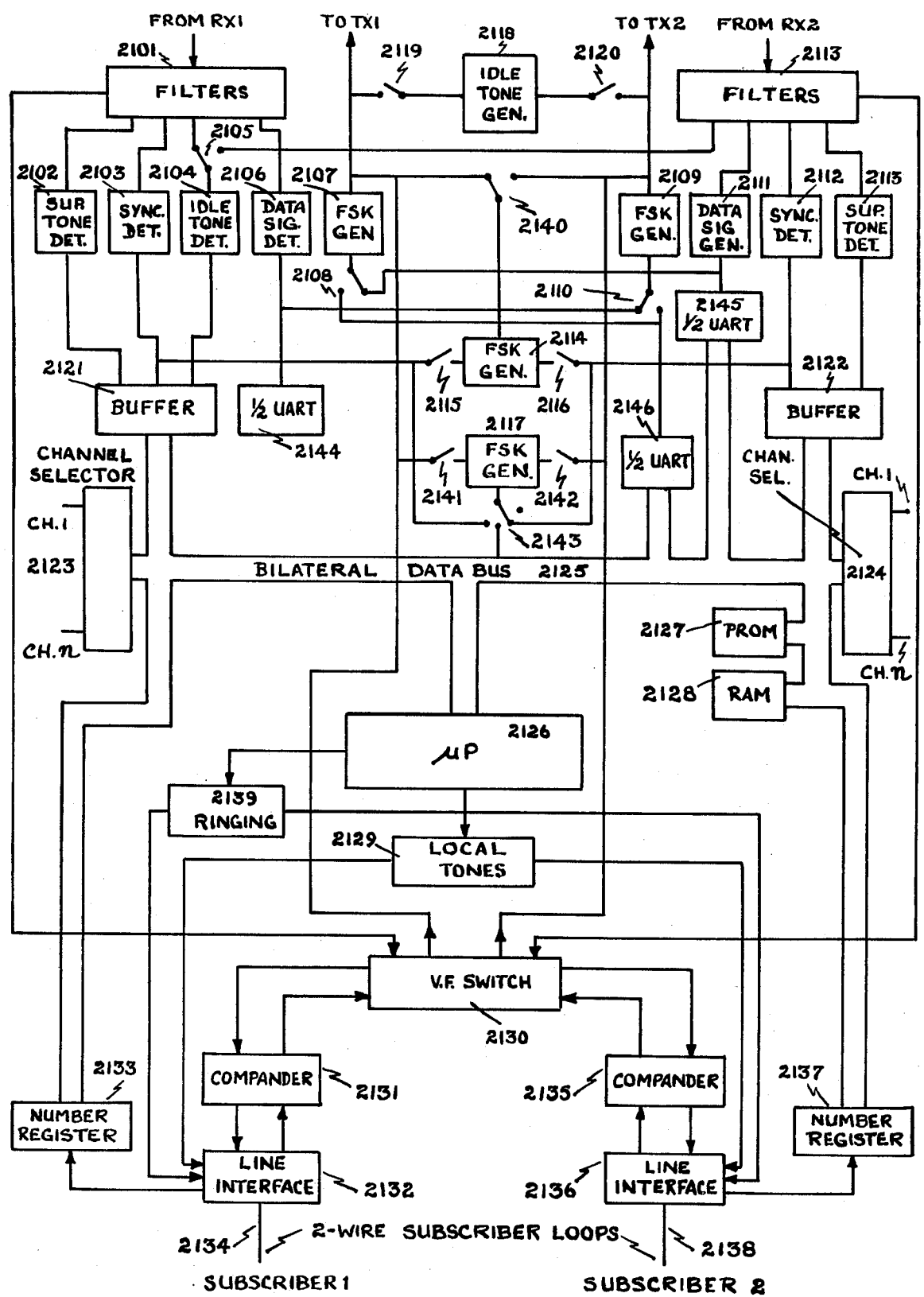
FIG. 21 is a radio subscriber station detailed block diagram.

FIG. 21 illustrates a detailed functional block diagram of the radio subscriber station. The equipment operation is controlled by a commonly available microprocessor 2126 and associated program stored in a programmable read-only memory (PROM) 2127. The radio subscriber station, as previously described, serves two network subscribers via two wire subscriber loops 2134 and 2138, respectively. Furthermore, it controls two duplex radio transceivers which may be operated as separate entities or may be electrically connected to operate as a repeater. The operating radio channels are selected by channel selectors 2123 and 2134 for radios 1 and 2, respectively. The channel selectors are binary to decimal decoder chips.

Input signals from receivers R×1 and R×2 are connected to filters 2101 and 2113, which separate the various tones, signaling and V.F.

Inasmuch as an idle tone is required to be received by one receiver or the other, common detector 2104 serves both receivers and is appropriately switches by switch 2105 under the control of the microprocessor. The tone detector 2104 is a commonly available monolithic phase-locked loop circuit tuned to receive the 2000 Hz tone and provide a binary 1 output when idle-tone is present and binary 0 in the absence of idle tone. Similarly supervisory tone detectors 2102 and 2113 are phase-locked loop circuits tuned to receive a frequency of 207 Hz.

Data signalling detectors 2106 and 2111 and the sync detectors 2103 and 2112 are preferably monolithic phase-locked loop FSK detectors. Sync detectors 2103 and 2112 have two functions: detecting the master sync signal from the central radio station control terminal; and detecting dialed digit signals. The sync signalling is regenerated by FSK regenerator 2114 and retransmitted by appropriate setting of switches 2115, 2116 and 2140. The dialed digit signalling is regenerated by FSK regenerator 2117 by appropriate setting of switches 2141, 2142 and 2143. Locally originated dialed digit signalling is accomplished by setting the switch 2143 to connect the FSK regenerator 2117 to the bilateral data bus 2125 transmission in the desired direction. The output signals from the data signalling detectors 2106 and 2111 are switched via switches 2110 and 2108 under the control of the microprocessor 2126, to FSK regenerators 2109 and 2107, respectively, to provide retransmission, as required.

Local call data signalling to the central radio station control terminal is accomplished by using one or other of the FSK regenerators 2107 and 2109 by closing either switch 2108 or 2110 from the transmit half of the Universal Asynchronous Receiver Transmitter (UART) 2146, which is connected to the data bus 2125. The output signals from the data signalling detectors 2106 and 2111 are converted from serial to parallel format and checked for parity, etc., by the receive halves of the UARTS 2144 and 2145 which are connected to the bilateral data bus 2125.

Idle tone is locally generated at the radio subscriber unit by the idle-tone generator circuit 2118. This circuit generates a 2000 Hz sine wave which may be transmitted in either direction in the system by closing either switch 2119 or 2120. The bilateral data bus, 2125, operates in the three-state mode; thus, the signalling inputs from the radios are connected to it by means of three-state buffers 2121 and 2122. Similarly, the output signals from the number registers 2133 and 2137 are three-state, as are the RAM 2128 and PROM 2127. The VF switch 2130 provides four-wire connection of the VF from each radio transceiver to either subscriber, as required, and direct connection of subscriber 1 to subscriber 2, without the use of the radio equipment. Companders are used in each subscriber circuit in accordance with accepted telephone practice. Dynamic companding within a range of 60 dB is achieved by use of commonly available compander circuits.

The line interface circuits 2132 and 2136 provide two-wire to four-wire conversion by means of standard hybrid transformers, for connection of the subscriber loops 2134 and 2138 to the radio equipment. The line interface circuits also detect the on-hook/off-hook condition of the subscriber telephone instruments and supply speaking current in the latter condition. These circuits follow accepted telephone practice and do not contain any novel circuitry. Busy-tone, N.U. (Number unobtainable) tone and dial-tone are locally generated by the necessary oscillators contained in the local-tone generator circuit 2129. Locally generated returned ringing is also provided by this circuit for network subscriber-to-network subscriber calls. Subscriber instrument ringing current is generated by the ringing circuit 2139.

The number of registers 2133 and 2137 receive either dial impulses or dual-tone multi-frequency signalling from the subscriber instruments and convert it to four-bit binary coded digits in the conventional manner. The subscriber numbers may be programmed into the PROM 2127 or provided by hardware with three-state buffered output to the bilateral data bus 2125.

C. Central Control Terminal General Configuration

The central control terminal performs all the major system control functions, interfaces the 4-wire radio channels with 2-wire (or 4-wire) telephone trunks, and provides all the necessary switching and operating tones. The control terminal consists of a common control unit, a time division multiplexed (TDM) switch and a number of channel units which interface with the radio equipment. The central control terminal may theoretically be equipped with any number of channel units and interface with any number of telephone trunks, the only limitation being the microprocessor speed.

D. Channel Unit

Figure 22:
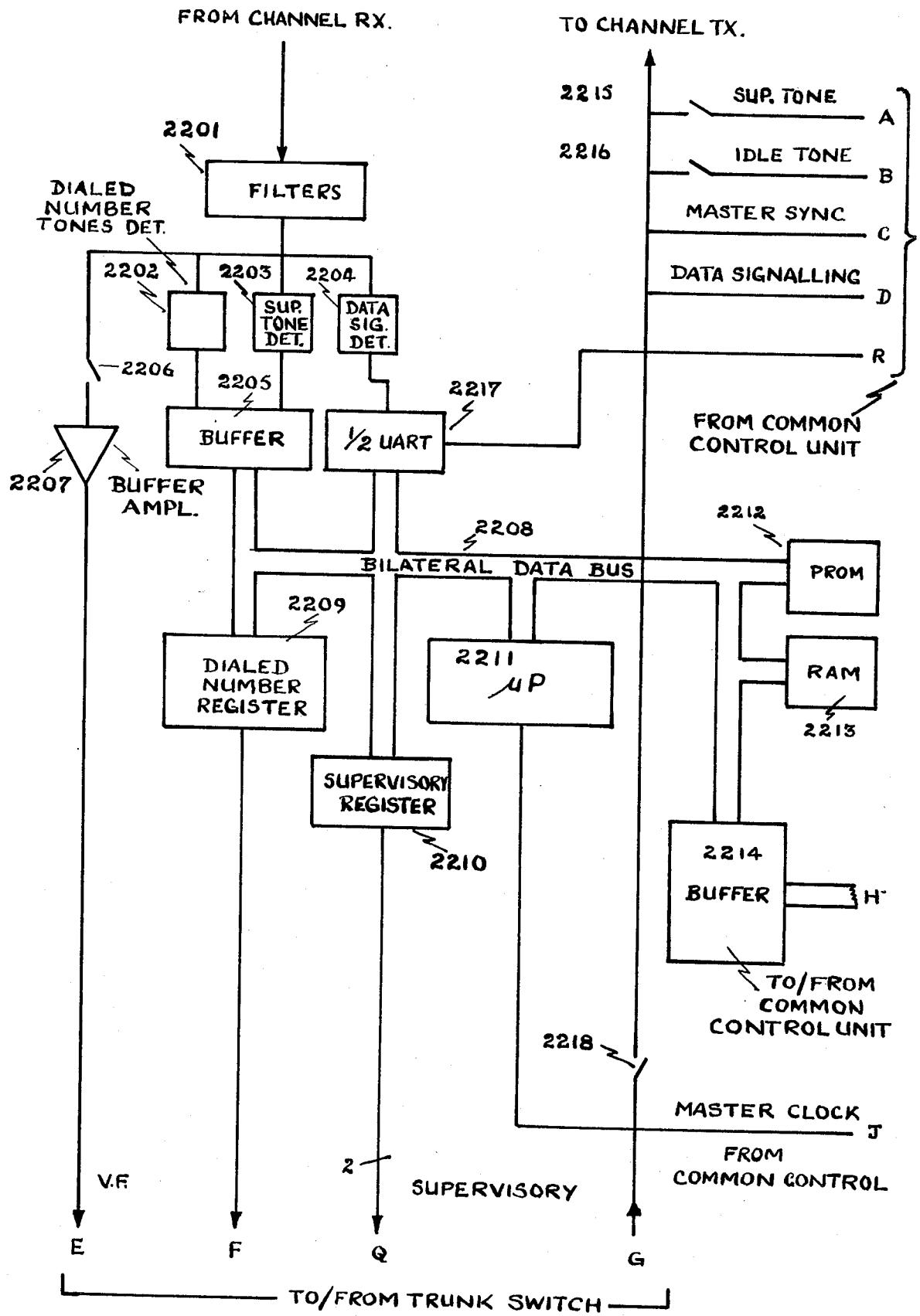
FIG. 22 is a block diagram of a central control terminal channel unit.

FIG. 22 is a detailed functional block diagram of a control terminal channel unit. The operation is controlled by a commonly available microprocessor circuit 2211, in conjunction with the program stored in the PROM 2212. Random-access-memory (RAM) 2213 provides temporary memory for processing purposes and call conditions during communications. The demodulated received signal from the channel receiver is connected to the filter circuits 2201 which separate the component tones and sub-channels. The VF speech sub-channel is connected to the trunk switch, FIG. 24, via the switch 2206, buffer amplifier 2207 and line E.

The data signalling detector 2204, with associated UART 2217 and the dial impulse detector 2202 are similar to those described above in relation to the radio subscriber unit, FIG. 21. The supervisory tone detector 2203 is also similar to that described above. The outputs of the supervisory tone and dial impulse detector are connected to the bilateral data bus 2208 via the three-state buffer 2205.

Called numbers from network subscribers originating calls to other network subscribers, or to telephone subscribers in the primary telephone system, are detected by the dial impulse detector 2202 and stored in the dialed number register 2209. The dialed number register comprises a shift register with parallel outputs, which may be gated as required to the bilateral data bus 2208, and a serial output to the trunk switch via line F. Two supervisory wires, one input and one output, are connected to the trunk switch via line Q from the supervisory register 2210. The register consists of two set/reset flip flops, one with a three-state output for connection to the bilateral data bus 2208, the other being set or reset by the microprocessor 2211. These states of the supervisory lines reflect the on/off-hook conditions of the calling and called subscribers.

Figure 23:
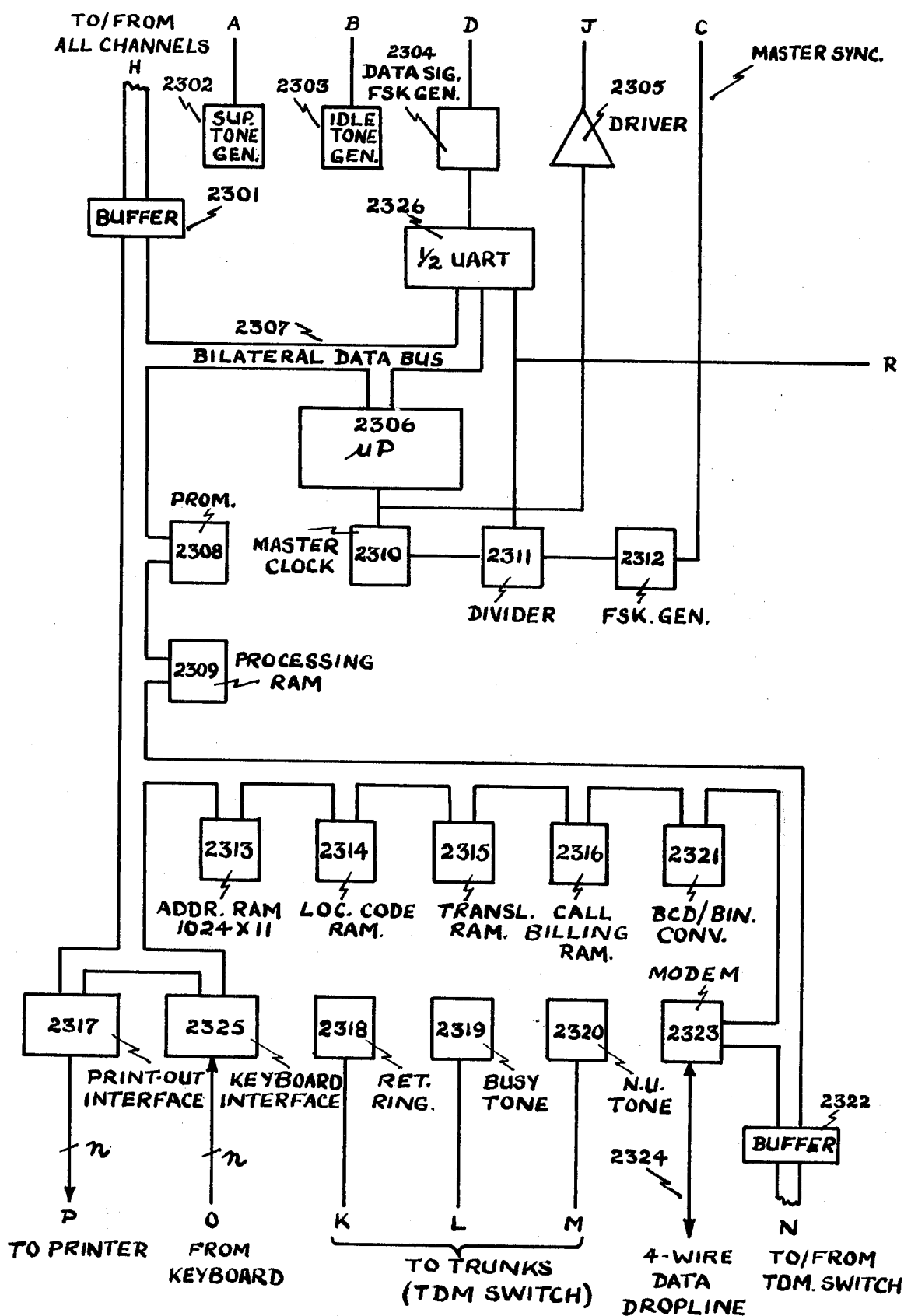
FIG. 23 is a block diagram of the central control terminal common control unit.

The microprocessor employs a master clock signal derived from the common control unit, FIG. 23, via line J. Similarly, the system control data signalling and master sync signals, which are common to all channels, are derived via lines D and C from the common control unit. Supervisory-tone and idle-tone are both generated by master circuits in the common control unit for the sake of economy. These signals are connected to the channel radio transmitter modulator input via lines A and B and switches 2215 and 2216, respectively. The VF speech channel is connected to the channel transmitter from the trunk switch via line G and switch 2217.

Each channel circuit communicates with the common control unit via a bilateral bus arrangement H. The buffer 2214 has latched inputs and three-state outputs in each direction so that data may be transferred bilaterally without the necessity of processing interrupt conditions.

E. Common Control Unit

FIG. 23 illustrates a detailed functional block diagram of the central control terminal common control equipment. Operation of the circuit is controlled by a microprocessor 2306 in conjunction with the operating program contained in PROM 2308. Temporary processing memory is provided by a RAM 2309. An address RAM 2313, location code RAM 2314 and translation RAM 2315 correspond to memories 1902, 1904 and 1914 and their functions are described in detail above in conjunction with FIG. 19. A call billing RAM 2316 is made up of memory chips and may be of any convenient size. Call information, both for billing purposes and system analysis, as described above, is temporarily stored in this memory prior to being printed out on a peripheral printer interfaced with the system by means of the print-out interface 2317 and line P. The various location codes and other relevant data, as described above, is entered into RAMs 2313, 2314 and 2315 by means of a keyboard connected to line O and the keyboard interface 2325. The outputs of the keyboard interface are three-state for suitable operation with the bilateral data bus 2307.

The common control unit is connected to the channel units via the three-state latched bilateral buffer 2301 and connecting bus H. Supervisory-tone and idle-tone are supplied to all channels from the master generators 2302 and 2303 and lines A and B, respectively.

System control data signalling is common to all channels, as previously described, and is provided by the microprocessor to the transmit half of the UART 2326, in eight-bit parallel form via the bilateral data bus 2307. The UART adds the necessary start, stop and parity bits required for transmission. The clock signal for the UART is derived from an output of divider 2311 which is driven by the master clock 2310. This timing output is also provided to the receiver UART 2217, FIG. 22, via connection line R. Divider circuit 2311 has a second output at a much lower frequency to provide the 6.8 Bps master sync signal via the FSK generator 2312 and output line C. The master clock signal is connected to all channel units via the driver amplifier 2305 and connecting line J.

The common control unit of FIG. 23 is connected to the trunk switch by means of the latched three-state bilateral buffer 2322. The BCD to 10-bit binary code converter 2321 performs the conversion of dialed numbers received from either network subscribers or primary telephone system subscribers originating calls to network subscribers. As described above, all subscribers are identified by 10-bit binary numbers. The BCD-to-binary conversion could equally well be undertaken by the microprocessor, provided that sufficient processing speed and time is available in the system. The modem 2323 connected to the bilateral data bus 2307 provides the necessary data link, via the four-wire data drop-line 2324, with other central radio station control terminals in conjunction with the traffic equalization call handoff facility.

F. Time Division Multiplex Trunk Switch

Figure 24:
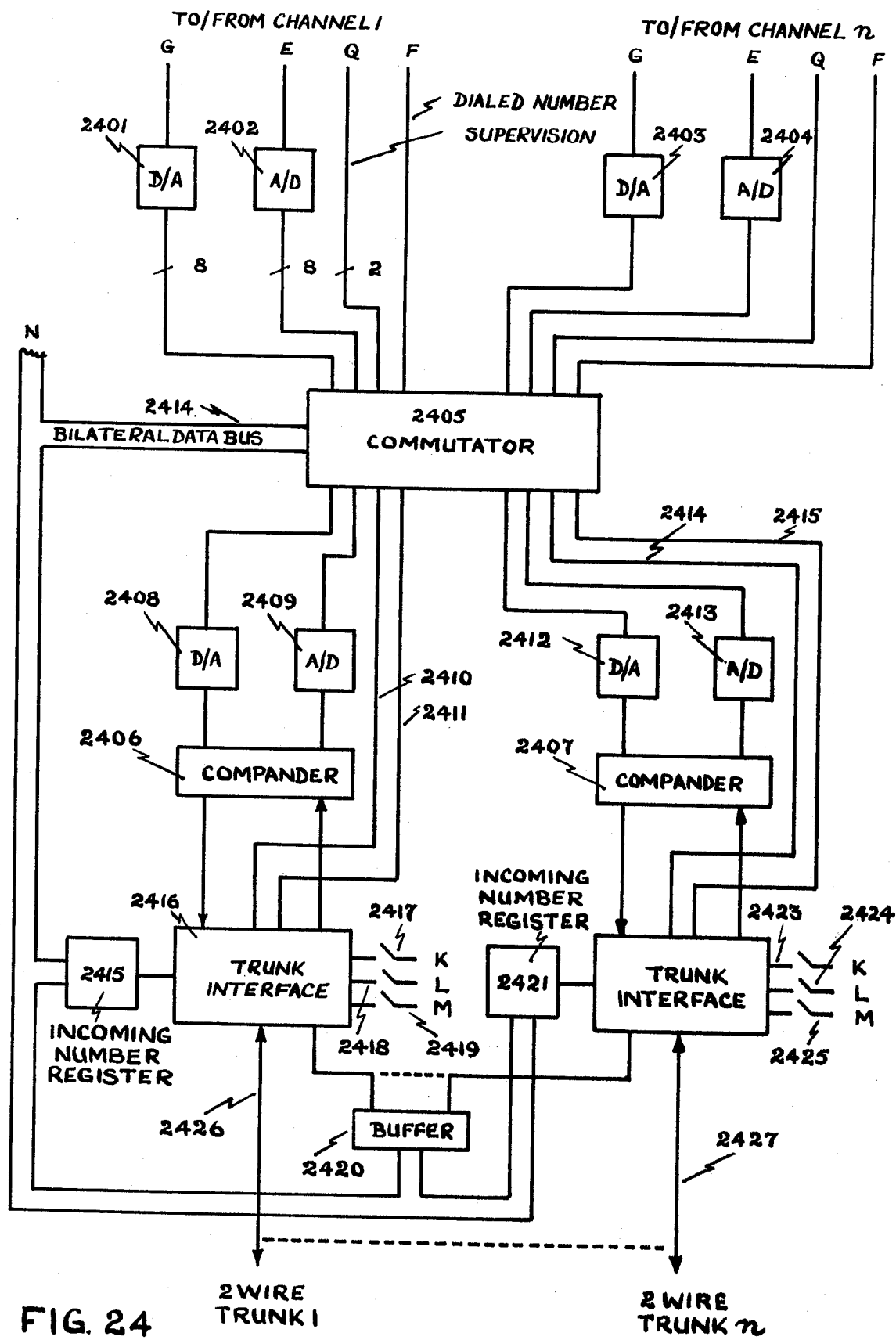
FIG. 24 is a block diagram of the central control terminal TDM switch.

FIG. 24 illustrates detailed functional block diagram of the TDM trunk switch. The switch performs the function of connecting any one of n channels to any one of n trunks and also connecting any number of pairs of trunks together for call rerouting via other central radio stations. The TDM switch consists of: a number of pairs of 8-bit analog-to-digital and digital-to-analog converters 2401, 2402 through 2403, and 2404, equal to the number of channels for which the terminal is equipped; and a number of 8-bit analog-to-digital and digital-to-analog converters 2408, 2409 through 2412, 2413, equal to the number of interconnecting telephone trunks. The analog-to-digital and digital-to-analog convers are commercially available monolithic IC's with conversion time of better than 125 microseconds. Each analog-to-digital and digital-to-analog converter is equipped with the necessary low pass filter on the analog side in accordance with accepted telephone practice. The analog-to-digital outputs and the digital-to-analog inputs are latched. The commutator 2405 is made up of a number of sequentially enabled groups of gates so that a group of gates representing a channel connection is momentarily enabled, as a result of which the analog-to-digital outputs are present on a bus connecting all analog-to-digital gate outputs together. Simultaneously, a selected group of gates representing the input to a specific trunk digital-to-analog is enabled and, therefore, the data is transferred. Conversely, the data from the associated trunk analog-to-digital converter is transferred to the channel digital-to-analog converter via gating and a second data bus. The commutator circuit is controlled by a register which contains the necessary address codes of the communicating pairs of gate groups. This address coding is provided by the common control unit (FIG. 23) via the bilateral data bus 2414 at connection N. The groups of gates include three additional gates which complete the two-wire call supervision circuits 2410 and the dialed number circuit 2411 from input F to the trunk interface 2416. Each trunk connection to the TDM switch has a compander 2406, 2407 similar to companders 2131 and 2135 in FIG. 21.

The trunk interfaces 2416 and 2422 perform the two-wire to four-wire conversion and the signalling and supervision functions as required for operation with the primary telephone system. The interface circuit provides reversed battery or other call supervision, as required by the interfacing trunk and the necessary seizure detection and start-interface, in accordance with accepted telephone practice. Additionally, the trunk interface provides call signalling conversion from BCD to either dial impulsing or DTMF by means of commercially available monolithic integrated circuits in either case. The incoming number registers 2415 and 2421 receive signalling from their related trunks and convert it to BCD. It is then stored in a series of latches which may be read into the common control circuit of FIG. 23 as required, via the bilateral data bus 2414 and connection N. Seizure of an interface by an interconnecting trunk is signalled to the common control unit via the three-state buffer 2420 and the bilateral data bus. The necessary operating tones; busy-tone, N. U. tone and returned ringing are derived from the common control unit via connecting lines L, M and K and are switched on and off under the control of the common control circuit (FIG. 23) via switches 2418, 2419, 2417, 2424, 2425 and 2423.

VI. System Call Sequences

A. General

The system operates in a synchronous mode controlled by the master clock in the central radio station control terminal. The application of supervisory tones and signalling is a logical progression according to the status of calls or call attempts. The tones are applied and/or removed at specific timing points as a result of associated events.

B. System Idle

Figure 25:
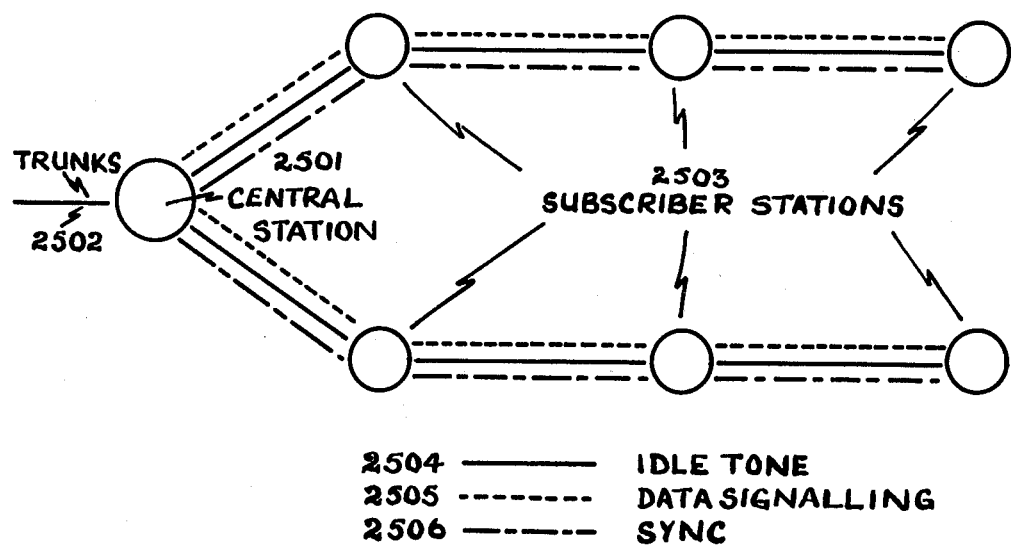
FIG. 25 is a diagram showing the system idle condition.

FIG. 25 illustrates a small section of a typical switched radio network telephone subscriber system. The central radio station 2501 interfaces with the primary switched telephone network by means of the trunks 2502. The radio links connecting the radio subscriber stations 2503 are in the idle condition and are all configured as radio repeater stations.

Idle tone 2504 is transmitted on the two channels from the central radio station 2501 to the first two radio subscriber stations 2503. Locally generated idle tone is transmitted by these stations to the next units and so on. The system control data signalling channel 2505 from the central radio station is active in that the time code only is transmitted, thus providing signal lock for the subscriber station receivers. Continuous master sync signal 2506 is also transmitted by the control radio station. Both the data signalling and the sync signal are regenerated and repeated by the radio subscriber stations. Supervisory tone is switched off. All tones are off from the radio subscriber stations in the direction of the central radio station with the exception of the call data signalling which is transmitted by the most distant radio subscriber stations and repeated by the others as a continuous space tone.

C. Radio Subscriber Call Without Repeater

Figure 26:
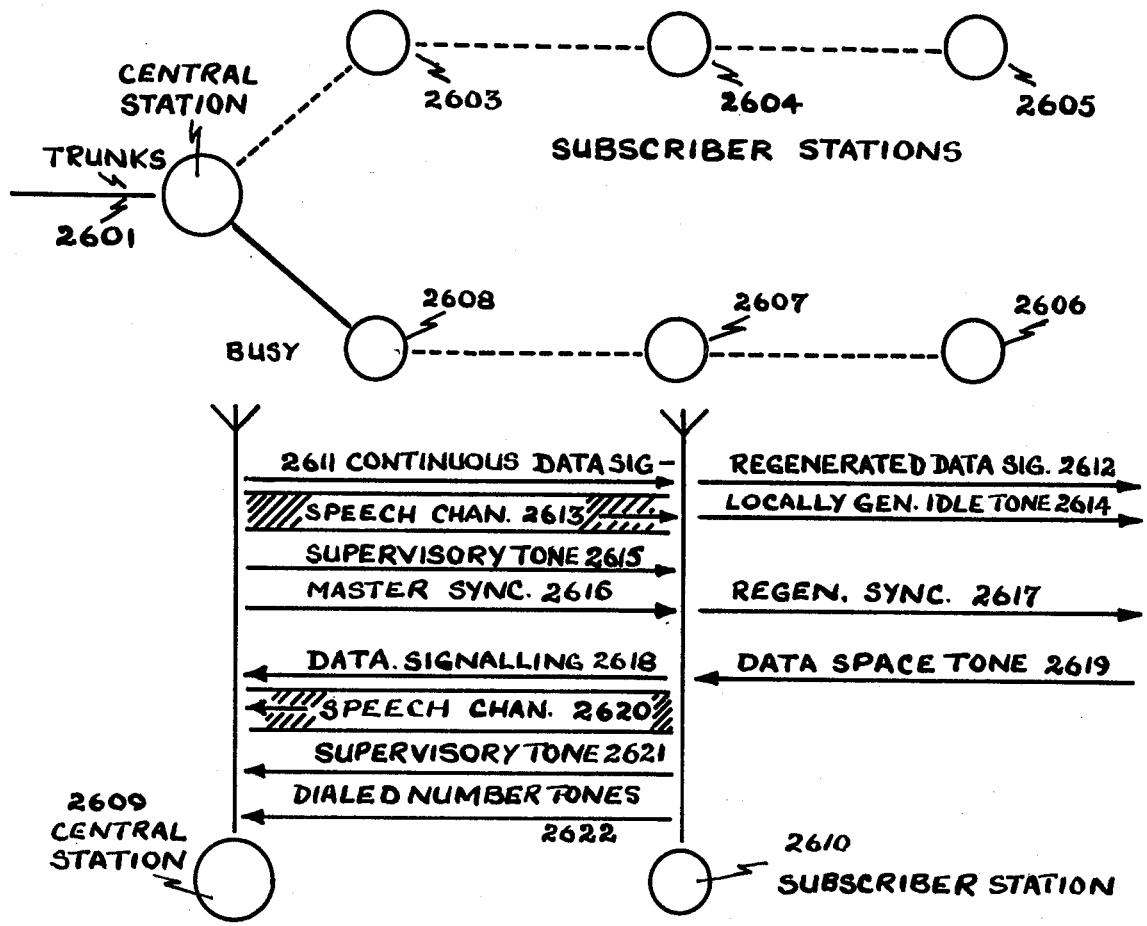
FIG. 26 is a diagram showing the radio subscriber busy condition.

FIG. 26 shows a small section of a typical network wherein radio subscriber units 2603 through 2607 are idle in similar conditions to those described in the immediately preceeding paragraph. One subscriber served by radio subscriber station 2608 is busy in communication with a primary telephone system subscriber via central radio station 2601. The call set-up process starts with conditions similar to those shown in FIG. 25. If the call is originated by a radio subscriber served by station 2608, the off-hook condition switches on the supervisory tone 2321. This causes the central radio station 2601 (2609) to remove the idle tone. Simultaneously the radio subscriber station 2608 transmits a 44-bit call data signalling frome containing a "call request" control code (0000) and the network subscriber 10-bit ID code. The remaining information bits in the byte are set to binary 0. The central radio station control unit recognizes the request and verifies that the channel is presently idle then transmits a forty-four-bit system control data message with the "dial-tone on" control code followed by the radio subscriber ID code. The channel code is the same as that for the channel to which the radio subscriber is presently tuned. A time code accompanies the foregoing information to complete the byte. The radio subscriber station now returns dial tone to the calling subscriber and switches on the dialed number FSK generator. Dial tone goes off when dialing is commenced. The dial impulses or DTMF tones from the subscriber are converted to BCC digits and each digit is transmitted, accompanied by a parity check bit. On the receipt of either the first digit (in the case of an operator call) or the first three digits, the control terminal recognizes if the call requires the use of a trunk or not; it also recognizes how many digits must be dialed to complete the called number. The digits are stored until the number is completed at which time a trunk is seized by the terminal. The digits are transmitted to the interconnecting telephone exchange either as dial impulsing or multi-frequency signalling, as required. On receipt of the required number of digits, the control terminal sends a frame of control data signalling to the radio subscriber, which frame contains the control code "digit FSK off" (0101), plus the radio subscriber ID and a time code. The radio subscriber system responds by turning off the dialed digit FSK and opens the VF channel to the subscriber so that the subscriber may receive returned-ringing, busy-tone, etc., from the called party's exchange. The control terminal stores the data/time code in memory when the call is attempted, and further information is added as the call progresses. Similarly, the radio subscriber station stores the received time code when the subscriber removes the telephone instrument off-hook. This information is cancelled when the dial-tone control code is received.

Assuming that the called party answers, completion of the call is signalled to the control terminal by a reverse battery or other call supervisory signal. The control terminal then commences timing of the call for billing purposes by entering a time code into memory with the other call information already stored. The supervisory tone is returned from the control terminal to the radio subscriber station.

The radio channel condition is as illustrated in FIG. 26. Under the assumed conditions the dialed number tones 2622 are not present, the data signalling channel 2618 is idle, and only a space tone is transmitted. At the end of the call either party may replace their handset and cause a first-party release sequence to take place. If the called party replaces the instrument on-hook first, the reversed battery or other mode of supervision causes the control terminal to remove the supervisory tone 2615 from the channel and disconnect the VF speech circuit. In addition the trunk, trunk switch are released and the idle-tone is switched on. A time code is added to the billing information in memory. The radio subscriber station detects the loss of supervisory tone 2615, disconnects the speech channel with the subscriber, and switches off the supervisory tone 2621. If the subscriber does not replace the handset on-hook within a predetermined time, a locally generated busy-tone is returned automatically. Another call may not be originated until the handset has been returned to the on-hook condition. If a call is attempted from a third party and the telephone instrument has been left in the off-hook condition, the radio subscriber station responds with the control code indicating "off-hook fault" (0101), plus the subscriber ID code. This results in a busy-tone returned to the calling subscriber.

In the case where the network subscriber initiates the first-party release, the supervisory tone 2621 is removed from the channel and the VF speech channel is switched off. The control terminal detects the loss of this tone and releases the trunk, stores the necessary time code for billing, switches off the VF speech channel, releases the trunk switch, removes the supervisory tone 2615 from the channel, and switches on the idle-tone.

Where a call to a network subscriber is originated by a primary telephone system subscriber, the following sequence takes place. A trunk interface is seized by the interconnecting exchange and the required number of digits are repeated to the terminal where they are stored in the incoming number register, 2415, FIG. 24. The terminal common control unit converts the number into a ten-bit binary code and thus identifies the called radio subscriber. The address RAM 2313, FIG. 23, is read to see if the subscriber is busy. If so, a busy tone is returned to the calling subscriber for a predetermined time, after which, if the trunk has not disconnected, the terminal automatically disconnects the trunk. If the called subscriber is not busy, the common control unit selects a channel for communication in accordance with the call routing procedure previously described. The radio subscriber is then signalled via the system control data sub-channel. The control code used is the "call code" (1001), followed by the ten-bit binary subscriber number, the channel code and a time code. The channel code does not cause the radio subscriber station to change channels in this case. The control terminal removes the idle tone from the channel and switches on the supervisory tone 2615. The radio subscriber station decodes the message, recognizes its own ID and responds with a call-confirm code (0110), plus the subscriber ID. The control terminal compares the ID code with that transmitted and, if they match, locally generated returned ringing is transmitted to the primary network subscriber and the trunk switch is operated to connect the channel to the trunk. The radio subscriber unit monitors the supervisory tone 2615 for five frame times, as derived from the sync signal, and if the supervisory tone continues to be received, locally generated ringing is transmitted to the called subscriber instrument. When the subscriber answers by coming off-hook, the supervisory tone 2621 is switched on by the radio subscriber station and the VF channel is opened in both directions by the radio subscriber station and the control terminal. From this point on the call proceeds as previously described. It should be noted that call billing data is not stored, as the call was of third-party origin. However, call data may be recorded by the common control unit if required for system and traffic analysis.

D. Radio Subscriber Call Using a Repeater

Figure 27A:
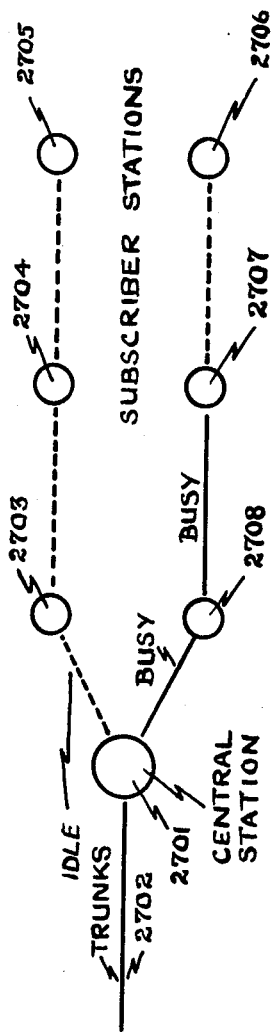
FIGS. 27a and 27b are diagrams of radio subscriber call via repeater operation.
Figure 27B:
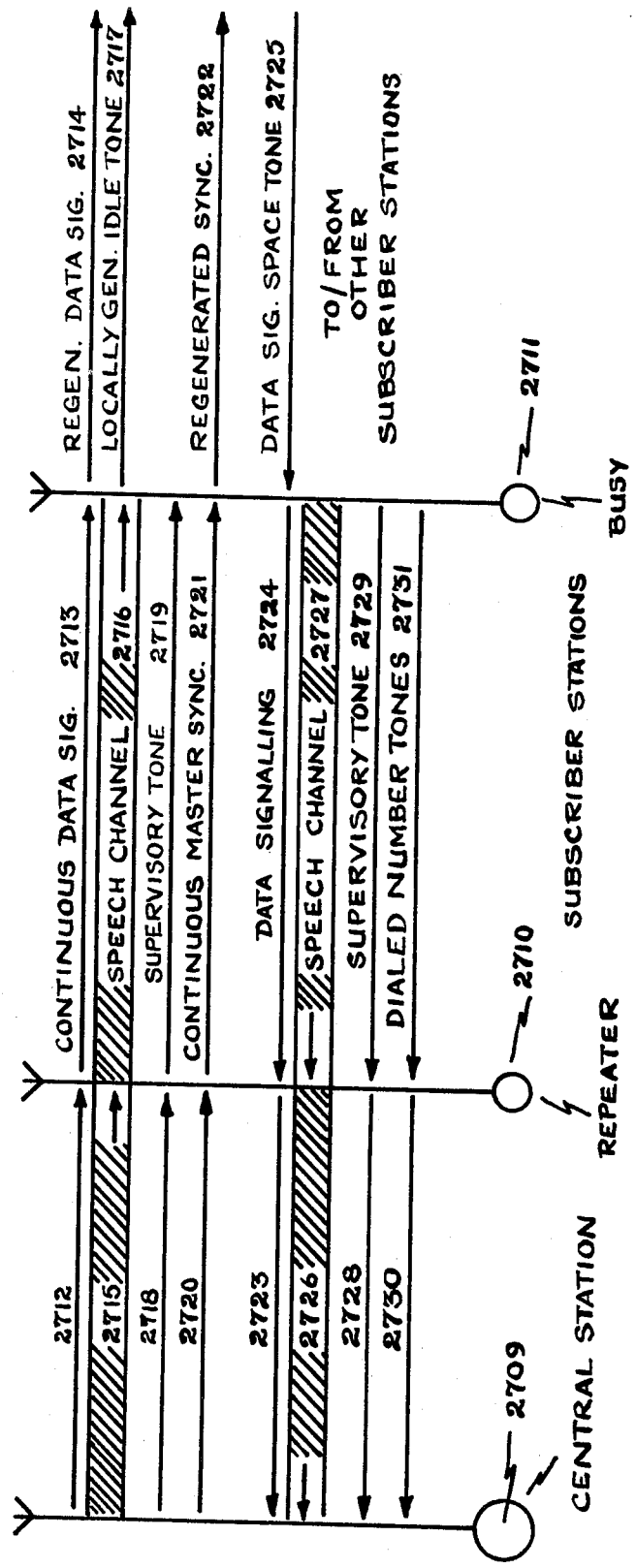

FIG. 27a illustrates a section of a typical system in which one of the network subscribers served by radio subscriber station 2707 is engaged in a call to a primary telephone system subscriber. The radio subscriber station 2708 is configured as a repeater to service this call; thus, neither of the subscribers served by this station may receive or originate a call at this time. The call set-up process is similar in all respects to that described in paragraph C immediately above. FIG. 27b illustrates the tones, signalling and VF speech channel conditions during the call. The dialed number tones 2731 only switch on during call set-up, after which they are turned off. It should be noted that all signalling is detected and regenerated prior to retransmission in both directions by the repeater 2710. When the call is in progress it is possible for another network subscriber, such as subscriber 2706, to originate or receive preliminary call instructions via radio subscriber stations 2707 and 2708, although the speech circuit is busy.

The system control data signalling 2714 is common to all channels, as previously described, and is repeated by all stations to corresponding adjacent stations. Thus, any subscriber in the system may be signalled. The call routing is set up as explained above and the actual channel switching of radio subscriber station 2706 takes place as follows. The calling signal contains a "call code" plus the called subscriber ID, selected channel code and time code. The called radio subscriber unit may also use the call data signalling 2725 to replay to the central radio station using radio subscriber stations 2707 and 2708 as repeaters. The answer-back message comprises a "call confirm code" plus the called ID and channel code. The control terminal sends a further message with the "channel switch command" (0010) as control code plus the radio subscriber number. The network subscriber now switches channels and send a call data message with the "channel switch complete" (0010) control code plus the subscriber ID. The supervisory tone is switched on by the control terminal and is repeated by all stations used as repeaters. The call then continues as previously explained. Conversely, if the call is originated by the network subscriber, the data signalling sub-channel 2725 is used to orginate the call and the dialed number is transmitted by activating the dialed number FSK signalling 2731. The call then proceeds as described above. It should be noted that when either the call data or dialed number signalling is in use, the idle-tone is removed from radio subscriber unit 2711; thus, double seizure is prevented. Idle-tone is switched off one frame prior to signalling.

E. Radio Subscriber Unit with Both Subscribers Busy

FIG. 28a shows a small section of a typical system in which both subscribers 2805 and 2806 served by radio subscriber station 2804 are simultaneously communicating with primary telephone system subscribers via the central radio station 2801. Radio subscriber unit 2807 is used as a repeater for the call with subscriber 1, 2805, and radio subscriber station 2803 is used as a repeater for the call with subscriber 2, 2806. Both calls are set up using the signalling subchannels via radio subscriber unit 2807. It is assumed that subscriber 1, 2805, originated (or received) its call first. The identification subscriber 1 and 2 refers only the order in which the calls are set up, as both subscribers may use either communication path, the one via radio subscriber unit 2807 being the preferred routing so that it will be allocated to the first call. The call is set up in accordance with the sequence described in Paragraphs C and D immediately above. The tones and signalling shown in FIG. 28b are transmitted between radio subscriber station 2804 and the central radio station and are identical with those shown in FIG. 27b.

The call to/from subscriber 2, 2806, is set up using the data signalling 2808, call data signalling 2818 and dialed number tones 2826 for communication with the central radio station control terminal. The control terminal then sets up the call routing via the radio subscriber station 2803, as described in paragraph D immediately above. When both subscribers are busy with calls via the central radio station, the system control data signalling 2808, 2809 and the master sync 2816 and 2817 are switched off between radio subscriber stations 2803 and 2804, as this would result in an undersirable loop around of signalling. Similarly, the call data signalling from radio subscriber station 2804 to the central radio station 2801 is not required, as a channel exists via radio subscriber unit 2807; thus, it is switched off. The control terminal causes the signalling to be shut down by sending a forty four-bit message containing: the control code "sync off; data signalling off" (1011); radio subscriber unit ID, and time signal; to unit 2803. The code 1011 identifies which of the two transmitter subchannels should be switched off. The code 1010 refers to the subchannels transmitted by transceiver 1 and the code 1011 refers to the sub-channels transmitted by transceiver 2. By virtue of the fact that both subscribers served by radio subscriber station 2804 are simultaneously in use, the control data signalling 2808 and the master sync 2816 are not repeated by this station. Instead, they are automatically switched off under local control when channel switching to route the second call takes place. The supervisory tones 2814 and 2824 are present between radio subscriber stations 2803 and 2806, as per any other call using a repeater.

F. Radio Subscriber to Radio Subscriber Call

Figure 29A:
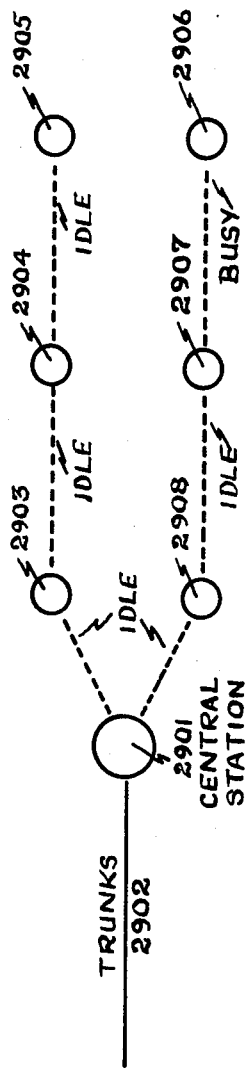
FIGS. 29a and 29b are diagrams of a radio subscriber-to-radio subscriber call.
Figure 29B:
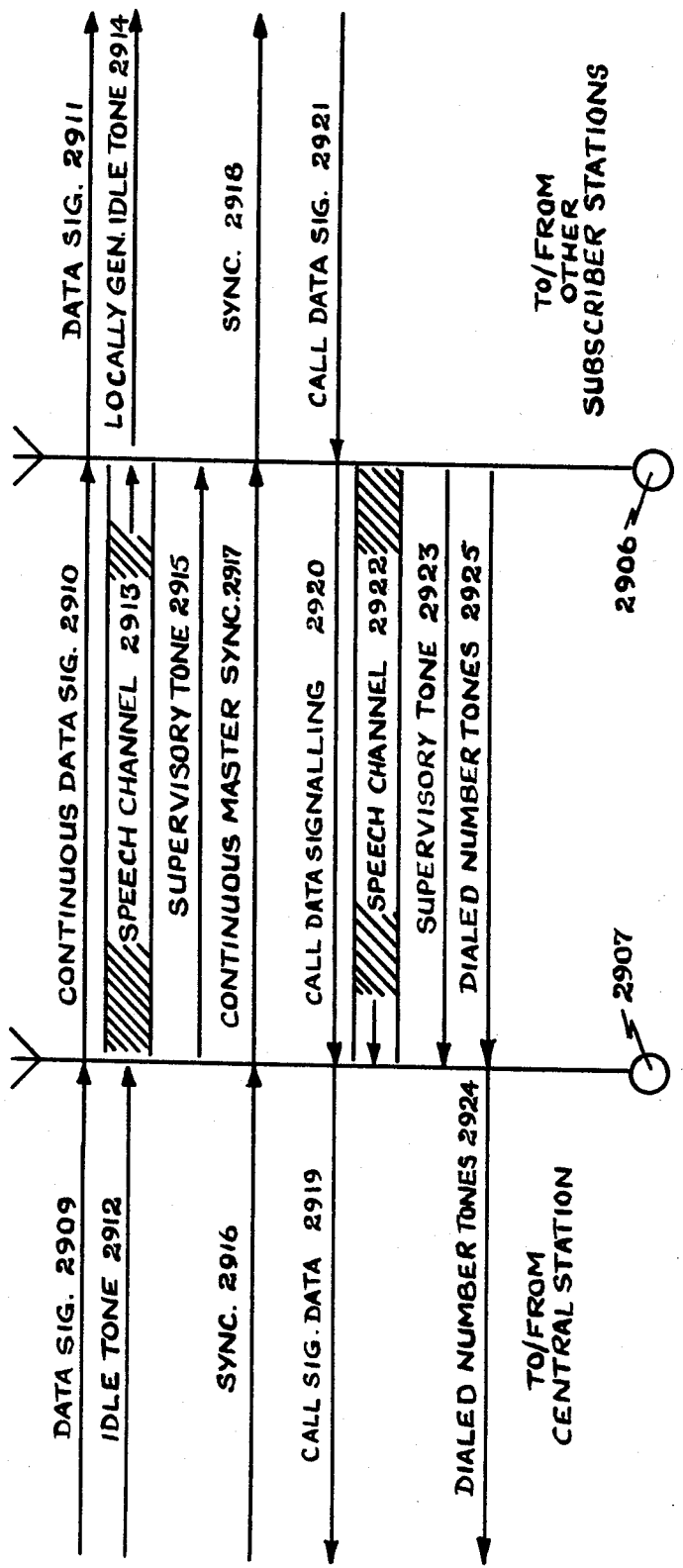

The part of a typical system illustrated in FIG. 29a and 29b shows two subscribers served by radio subscriber stations 2906 and 2907 in direct communication without using the central radio station 2901. The call may be set up by either party by use of the call data signalling 2919, 2920, and the dialed number tones 2924, 2925, which are temporarily switched on during the dialing process, after which, they are switched off. The off-hook call request signalling, identification and dialing sequence is the same as for other calls previously described. The common control unit in the central radio station control terminal determines from the initial three digits that the called subscriber is a radio subscriber within the system. The call routing selection takes place as described above.

Assuming the radio subscriber station 2907 to be the originating station, then the following signalling sequence takes place. The central radio station signals unit 2906 with a control data byte containing a "call code" (1001), plus 10-bit unit ID, channel codes and time code. The radio subscriber station responds by transmitting the "call confirm" control code (0110) plus ID and channel code. After five frames, ringing commences. The central radio station system control data signalling byte following the call byte to unit 2906 addresses radio subscriber station 2907 and contains a "local metering activate" control code (0011) plus subscriber ID and time code. The local metering is primed in the radio subscriber unit, but is not in fact activated until the call is completed. The time code is stored and counting takes place to provide a reference when the called subscriber answers. The radio subscriber station also transmits returned ringing to the calling subscriber. The next frame also signals radio subscriber unit 2907 and contains a "call via transceiver 2" control code. As a consequence, the supervisory tone is transferred from transmitter 1, in the direction of the central radio station 2901, to transmitter 2, in the direction of radio subscriber station 2906. The central radio station does not meter this call directly for billing purposes, as no supervisory tones are available with which to monitor the progress of the call. When the called subscriber answers, the supervisory tone 2923 is switched on and the speech channels 2913, 2922 enabled in each direction to the two subscribers. The local metering is now fully active in radio subscriber station 2907 and starts a separate time count from the moment the supervisory tone 2915 is switched on until one or other party replaces his instrument on-hook. Loss of supervisory tone in either direction causes disconnect and first-party release of the circuit. Radio subscriber station 2906 returns to the idle, standby condition. Radio subscriber station 2907 detects the idle tone 2912 transmission by radio subscriber station 2908 and seizes the call data signalling channel. Unit 2907 then transmits a byte containing a "call metering" control code (0011), followed by the subscriber ID and a seven-bit metering code. The seven-bit metering code is the total call length in half-minute intervals. As previously described, the time code is not required, but was stored for call attempt analysis only. If a time code is in fact required, it is a simple matter to program the radio subscriber unit to add the number of expired half-minutes counted to the originally stored time code and transmit this in the allotted space in the fourth four-bit frame. If the signalling channel is busy on cessation of the call, the radio subscriber unit waits in a condition of continuous search for the appropriate time to seize the sub-channel so that the data may be transmitted to the central radio station control terminal.

G. Network Subscriber to Network Subscriber Call Via Same Unit

As described above, two independent subscriber loops are provided by each radio subscriber station. It is possible for the two subscribers to communicate directly with each other without the use of a radio circuit. The call is set up in the same manner as the subscriber to radio call described in Paragraph VI. F. above. Local call metering is provided by the radio subscriber unit. The final system control data signalling frame transmitted by the central radio station to the radio subscriber unit contains a "local call" control code (1100). Receipt of this signal causes the radio subscriber station to connect the two subscriber VF speeck channels together at baseband. The radio stations are configured as a repeater station and may be used by other radio subscriber stations during the local subscriber to subscriber call.

H. Hand-Off Call

Figures 30, 31:
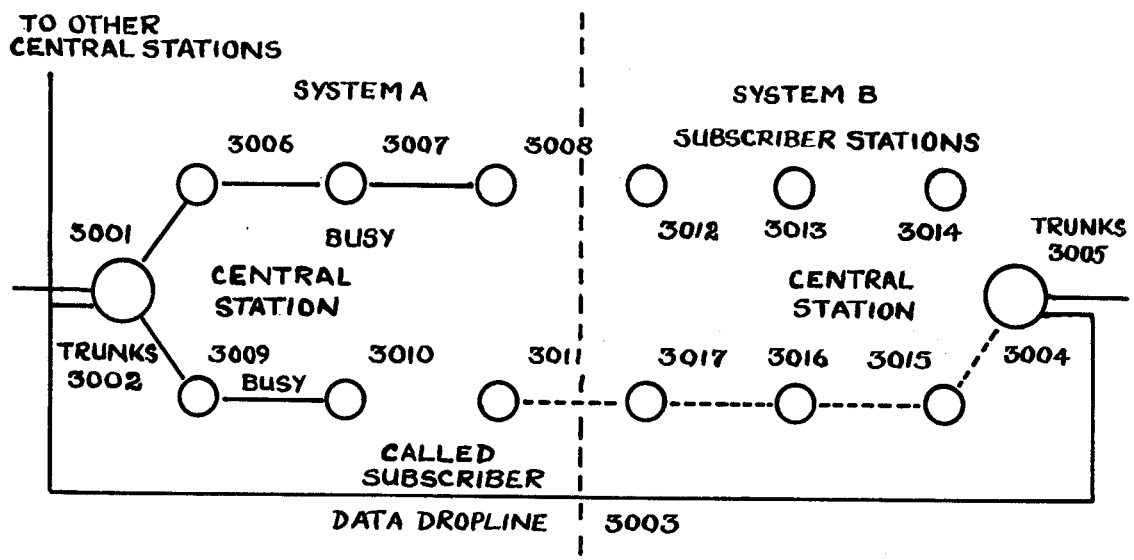
FIG. 30 is a diagram of a hand-off call sequence.
FIG. 31 is a diagram of mobile operation with ACTS.

As previously described, where two or more radio subscriber networks operate with one radio subscriber station from one system located within radio range of a radio subscriber station in the adjacent system, it is possible to re-route calls through the central radio station of the adjourning system. FIG. 30 shows two sections of two adjoining radio subscriber systems. System A is controlled by central radio station 3001 and System B is controlled by central radio station 3004. It is assumed that radio subscriber station 3011 may not presently communicate via central radio station 3001 inasmuch as the radio channels are in use. Station 3011 may signal or be signalled by the central radio station, as described above. Therefore, when a primary telephone system subscriber attempt to call network subscriber 3011, the following sequence takes place. The control terminal for central radio station 3001 tests the possible call routing and finds that all routes are busy. A message is then formulated, including the radio subscriber station 3011 location code and the location code of the radio subscriber station 3017 in the adjacent system. The message is addressed to central radio station 3004 requesting the necessary hand-off and is transmitted via the four-wire data drop-line 3003. Central radio station 3004 tests possible call routing to radio subscriber station 3011. On finding available routing via radio subscriber stations 3015, 3016 and 3017, it sets up these stations accordingly and replies to central radio station 3001 with an affirmative message, via the data drop-line, including a channel code for communication between radio subscriber stations 3011 and 3017. The central radio station 3001 now signals radio subscriber unit 3011 to switch channels in accordance with the information received. Simultaneously, the trunk switch in the control terminal seizes a second trunk and automatically dials the access digits to the central radio station 3004, followed by the final three digits of the number for radio subscriber 3011. When central radio station 3004 completes the trunk circuit it recognizes the three digits as those referring to radio subscriber station 3011, and the call is completed in the usual manner. The incoming and outgoing trunks at central radio station 3001 are connected back-to-back by the switch and thus route the call via the primary switched telephone network to central radio station 3004, and hence to subscriber 3011. The call then proceeds in the normal manner and when first-party release takes place, the radio subscriber station immediately switches channels from the special system interconnect channel and searches for a working channel in System A where it assumes a standby condition.

Conversely, under the busy conditions shown in FIG. 30, if the subscriber 3011 originates a call, the call set-up signalling is primarily conducted with central radio station 3001. A message is sent by central radio station 3001 to central radio station 3004 via the data drop-line 3003. The message contains the radio subscriber station ID number and the called number. If the called number would have been to a primary telephone system subscriber (seven-digit code) and is a toll call, the necessary three-digit area code is added to the number by central radio station 3001 in the message via the data drop line. The radio subscriber station 3011 is now signalled to switch to the hand-off channel. On switching, the radio subscriber unit 3011 signals "channel switch complete" and identifies itself to central radio station 3004. The call is automatically dialed into the primary telephone network by the central radio station 3004 control terminal and the call proceeds normally, as described above. After the circuits are released at the end of the call and the radio subscriber unit returns to a standby condition on a system A channel, the central radio station 3004 communicates via the data drop-line 3003 with central radio station 3001 to send the necessary call billing information for storage by that station.

VII. Operation of Mobile Equipment

A. General

Land mobile radio equipment may be operated in conjunction with the system provided that a compatible mobile signalling format is used. Mobiles operate in much the same way as radio subscriber stations; however, although dual radios may be employed, it is not advisable to use the mobiles as repeater stations because when mobile stations are in motion, radio propagation characteristics are extremely variable.

B. System Configuration and Operation

The system described in my U.S. Pat. No. 4,112,257, Comprehensive Automatic Mobile Radio Telephone System, issued Sept. 5, 1978, may easily be adapted for use with the present Switched Radio Network Telephone Subscriber Distribution System. It is assumed that the mobile equipment has compatible signalling arrangements with those described hereinabove. The radio subscriber stations may be used as base stations by the mobile unit, in which case, they will be configured as repeater stations, except where the mobile is in direct communication with a subscriber served by that specific radio subscriber station. It should be noted that unless adjoining systems with multiple central radio stations are used, it is not necessary to provide the location memory facility described in U.S. Pat. No. 4,112,257 (RMTS). The signalling, being common to all radio channels and therefore, received and repeated by all radio subscriber stations is automatically received by the mobile anywhere within the system. In a system with multiple control radio stations, the mobile in motion in a standby condition always seeks an operative channel, i.e., one having sync. As the mobile goes from one location served by a radio subscriber station, the received signal deteriorates below a preset threshold. The mobile immediately hunts for an operating channel, seizes it momentarily and identifies itself to the central radio station using the forty-four-bit format containing the "mobile registration" control code (0111). The mobile location is then entered into the central radio station control terminal mobile location memory. The central radio stations update the mobile location memories via the data drop-line in the manner described in U.S. Pat. No. 4,112,257. It is only essential to know in which adjoining system the mobile is located; more detailed information is unnecessary. The location memory is also updated when a mobile originates a call by seizing an idle channel.

The ACTS (Automatic Call Transfer System) described in U.S. Pat. No. 4,112,257, may also be used in conjunction with the system. The system required is simpler in that separate communications channels are not required for transfer; that is, although the radio subscriber stations operate as virtual base stations with respect to the mobile, they have no direct trunk interface with the primary telephone network.

FIG. 31 shows a typical arrangement for ACTS operation with four radio subscriber stations 3101, 3102, 3103, 3104. Common multi-channel receiver stations 3105 through 3113 are located between the radio subscribers, equidistant (radio propagation-wise) from each unit. By way of example, each radio subscriber station is shown as operating with a single pair of requencies FIT/FIR, etc., whereas in fact several paired pairs would be available at each unit. Each receiver station has the facility to receive the mobile transmit frequency, i.e., the radio subscriber station receiver frequency FIR, etc., associated with each of the four radio subscriber stations which it serves. This is accomplished by four separate receiver banks. With reference to receiver station 3109, it monitors FIR with respect to radio subscriber station 3101, F2R, F3R and F4R, in relation to radio subscriber stations 3102, 3103 and 3104, respectively. The outputs of these receivers are connected to their respective radio subscriber units by physical or radio circuits. Each radio subscriber station is equipped with a five-input comparator unit, as described under ACTS in U.S. Pat. No. 4,112,257. As the mobile 3114 moves to the left of FIG. 31, the signal level received by receiver 3109 increases and the signal level received by the radio subscriber station 3104 decreases. As threshold is approached at the radio subscriber station, a forty-four bit message is transmitted to the central radio station containing the control code "mobile switch request" (1000), the radio subscriber unit ID and the mobile ID, and using ten of the eleven bits normally reserved for the time code. The five-bit code normally reserved for the time correction code 1216 (FIG. 12) is used to indicate the quadrant and direction of motion by use of a three-bit code.

TABLE F

| Code | Quadrant | Direction |
|------|----------|-----------|
| 000  | A        | A to D    |
| 001  | A        | A to B    |
| 010  | B        | B to C    |
| 011  | B        | B to A    |
| 100  | C        | C to B    |
| 101  | C        | C to D    |
| 110  | D        | D to A    |
| 111  | D        | D to C    |

It should be noted that the letters in the direction column refer to quadrants of adjacent radio subscriber units. The forty-four-bit frame transmitted in the case of the example in FIG. 31 thus contains the code 000. On receipt of the message, the central radio station control terminal recognizes that the next logical radio subscriber station for communication is unit 3103. It therefore signals the mobile using the "channel switch data" (0001) and "channel switch command" (0010) control codes in two 44-bit messages to the mobile to effect the channel switch for communication via radio subscriber station 3103. Preparation of radio subscriber unit 3103 takes place as described in the previous call set-up descriptions.

Call metering for billing for mobiles originating calls in the system is provided by the central radio station for calls to primary telephone network subscribers. In the case of mobile-originated calls to radio subscribers within the system which do not use the central radio station during speech communication, call metering is provided the called radio subscriber station. The metering operation is set up as described in Paragraph VI. F. herein. The central radio station control terminal stores the initial call attempt in memory with the originating mobile number and the called subscriber number. When the final call billing information is received from the called radio subscriber station, it is entered into the call billing memory for the account of the mobile subscriber.

While I have described and illustrated specific embodiments of my invention, it will be clear that variations of the details of construction which are specifically illustrated and described may be resorted to without departing from the true spirit and scope of the invention as defined in the appended claims.

APPENDIX A
CENTRAL RADIO STATION-TO-RADIO SUBSCRIBER SIGNAL FORMAT

| | |
|---|---|
| 0000 | N/A |
| 0001 | Channel Switch Data |
| 0010 | Channel Switch Command |
| 0011 | Local Metering Activate |
| 0100 | Dial Tone On |
| 0101 | Digit FSK Off |
| 0110 | N/A |
| 0111 | Busy Tone On |
| 1000 | N.U. Tone On |
| 1001 | Call Code |
| 1010 | Sync/Data Signalling Off (Radio 1) |
| 1011 | Sync/Data Signalling Off (Radio 2) |
| 1100 | Call via Transceiver 1 |
| 1101 | Call via Transceiver 2 |
| 1110 | Local Call |
| 1111 | Repeat Request |

APPENDIX B

-continued

| RADIO SUBSCRIBER-TO-CENTRAL RADIO STATION SIGNAL FORMAT | |
|---|---|
| 0000 | Call Request |
| 0001 | Channel Code Confirm |
| 0010 | Channel Switch Complete |
| 0011 | Call metering Data |
| 0100 | Call Attempt Data |
| 0101 | Off-Hook Fault |
| 0110 | Call Confirm |
| 0111 | Mobile Registration |
| 1000 | Mobile Switch Request |
| 1111 | Repeat Request |

I claim:

1. A switched telephone network for servicing network subscribers located remotely from a primary switched telephone system, said network comprising:
   a central station;
   a plurality of spaced subscriber stations, each servicing subscribers associated therewith via at least one subscriber loop circuit, each subscriber station including;
   first multi-channel, frequency-agile duplex transmitter and receiver means for communicating with said central station and with others of said subscriber stations;
   second multi-channel, frequency-agile duplex transmitter and receiver means for communicating with said central station and with others of said subscriber stations;
   wherein said central station includes:
   means for establishing and controlling communication between said primary switched telephone network and said subscriber stations, said last mentioned means including multiple duplex transmitter and receiver means, each utilizing a respective channel of the multiple channels used by the first and second transmitter and receiver means of said subscriber stations;
   and wherein said subscriber stations include means for switching communications between said central station and adjacent subscriber stations, and also between two subscriber stations, such that said network utilizes intermediate subscriber stations as switching elements for communication purposes.

2. The network according to claim 1 wherein said first and second transmitter and receiver means at said subscriber stations, and said transmitter and receiver means at said central station, are duplex radio transceivers, and wherein some of said subscriber stations are disposed beyond radio transmitting and receiving range from said central station but within transmitting and receiving range of at least one other subscriber station which serves as a repeater between said central station and said some subscriber stations.

3. The network according to claim 2, wherein each radio channel includes a spectrum of frequencies which is subdivided into a communication sub-channel and a signalling and control sub-channel, and wherein said central station includes means for transmitting signalling and control information in the signalling and control sub-channel of all of said channels simultaneously.

4. The network according to claim 3 wherein said central station includes means for establishing the most direct routes for communications between two subscriber stations and between the central and subscriber stations when one or more subscriber stations serves as a repeater, said most direct routes being dependent upon the status of and availability of the first and second transmitter and receiver means of subscriber stations in the most direct and alternately most direct paths for said communications.

5. The network according to claim 1 wherein transmission between the individual subscriber stations, and between the central station and the subscriber stations, is via hard-wired transmission lines.

6. The network according to claim 1 wherein said subscriber stations are positioned in a grid-like pattern of rows and columns such that each subscriber station has a location which can be uniquely defined by its successive numerical position in the grid, and wherein said central station includes means for routing calls between two of said subscriber stations A and B by, in part, solving the algorithms:

$$v = |y_A - y_B| + 1:$$

$$h = |n_A - n_B| + 1:$$

$$d = v - 1 \text{ for } v < h; \text{ and}$$

$$d = h - 1 \text{ for } v > h,$$

where $y_A = a_A - n_A L$, $y_B = a_B - n_B L$, $a_A$ is the grid position number of station A, $a_B$ is the grid position number of station B, $n_A$ is one less than the row number in which station A is located, $n_B$ is one less than the row number in which station B is located, L is the number of stations in a row, v is the minimum number of columns involved in a call between stations A and B, h is the minimum number or rows involved in a call between stations A and B, and d is the minimum number of diagonal connections involved in direct ranking of a call between stations A and B.

7. The network according to claim 1 wherein said subscriber stations are positioned in a predetermined pattern, and wherein said central station includes means for routing calls to and from said subscriber stations using other subscriber stations as repeater stations in the most direct path possible through said pattern considering the busy and non-busy status of said subscriber stations.

8. The network according to claim 7 further comprising means at said central station for automatically switching calls in progress to use different subscriber stations as repeaters as the busy status of such stations change and permit more direct routing of said calls in progress.

9. The network according to claim 1 wherein each of said subscriber stations services network subscribers via two independent subscriber loop circuits.

10. The network according to claim 9 wherein each subscriber station includes means for transmitting calls from a first subscriber in one loop circuit to a second subscriber in the other loop circuit at the same subscriber station without utilizing any of said multiple channels and without utilizing said central station.

11. The network according to claim 10 wherein each subscriber includes means for permitting that subscriber station to serve as a repeater for calls to and from other subscriber stations during calls between said first and second subscribers.

12. The network according to claim 1 wherein said central station includes means for monitoring all calls to and from said subscriber stations, and means for calculating metering and billing information for said calls.

13. The network according to claim 12 wherein information concerning call monitoring is transmitted on said channels outside the voice frequency band in which communication takes place.

14. The network according to claim 1 wherein said central station includes means for compiling call traffic data for said network and wherein each subscriber station includes means for compiling and transmitting to said central station, data regarding unsuccessful call attempts made from that subscriber station.

15. The network according to claim 1 wherein said channels are radio frequency bands, and wherein at least some of said subscriber stations are movable.

16. The network according to claim 1 wherein subscriber telephone numbers are allocated on a random basis.

17. The network according to claim 1 wherein each subscriber station includes means for generating busy tone and dial tone and number unavailable signals.

18. The network according to claim 17 further comprising means at each subscriber station, responsive to a call made at that station to another subscriber station which is already busy, for locally generating a busy signal and releasing the communication channel on which the call was attempted.

19. The network according to claim 17 further comprising means at each subscriber station, responsive to a call made at that subscriber station to a telephone number which is not obtainable, for locally generating a number unobtainable signal and releasing the communication channel on which the call was attempted.

20. The network according to claim 1 further comprising means responsive to heavy call traffic in said network for transferring calls between an outlying network subscriber and the primary telephone system through a central station in a nearby similar network.

21. The method of servicing telephone subscribers, which are not physically connected into a primary telephone system, by means of a network having a central station and plural spaced subscriber stations, the central station serving to provide access to the primary telephone system for the network subscribers, the spaced subscriber stations each serving to provide access to the network for at least one subscriber by transmitting and receiving calls intended for that subscriber, said method being characterized by the steps of:
relaying calls to subscriber stations located beyond the transmission range of the central station by means of at least one of several others of said subscriber stations configured as a repeater station, said other subscriber stations being capable of receiving and transmitting calls via more than one frequency which is selected by the central station; and
automatically changing, in mid-call if necessary, the subscriber stations used as repeater stations for a call, as call traffic permits, to minimize the number of subscriber stations so used.

22. The method according to claim 21 wherein calls between two network subscriber stations are not transmitted through said central station.

23. The method according to claim 21 wherein each subscriber station services two subscriber loop circuits and wherein calls between a subscriber in one loop circuit and a subscriber in the other loop circuit of the same subscriber station is accomplished without call transmission through the central station.

24. The method according to claim 21 wherein calls between two subscribers served by different subscriber stations are achieved without call transmission through the central station.

25. The method according to claim 21 wherein the central station receives and compiles call metering and billing information for all calls involving network subscribers.

26. The method according to claim 21 wherein at least some of said subscriber stations are mobile radio-telephone stations.

27. The method according to claim 26 wherein the location of each mobile radio-telephone station is continuously provided at said central station.

28. The method according to claim 21 wherein, in response to a call from a first network subscriber station to a second network subscriber station the second network subscriber station is found busy, the first subscriber station locally generates a busy signal and releases the communication channel on which the call was attempted.

29. The method according to claim 21 wherein outlying network subscriber stations are capable of transmitting and receiving calls to the primary telephone system through a neighboring network and the central station associated with that network.

30. The method of servicing telephone subscribers, which are not physically connected into a primary telephone system, by means of a network having a central station and plural spaced subscriber stations, the central station serving to provide access to the primary telephone system for the network subscribers, the spaced subscriber stations each serving to provide access to the network for at least one subscriber by transmitting and receiving calls intended for that subscriber, said method being characterized by the step of relaying calls to subscriber stations located beyond the transmission range of the central station by means of at least one other of said subscriber stations configured as a repeater station;
wherein at least some of said subscriber stations are capable of transmitting and receiving two calls simultaneously via two frequently-agile, multi-channel duplex radio transceivers.

31. The method of servicing telephone subscribers, which are not physically connected into a primary telephone system, by means of a network having a central station and plural spaced subscriber stations, the central station serving to provide access to the primary telephone system for the network subscribers, the spaced subscriber stations each serving to provide access to the network for at least one subscriber by transmitting and receiving calls intended for that subscriber, said method being characterized by the step of relaying calls to subscriber stations located beyond the transmission range of the central station by means of at least one other of said subscriber stations configured as a repeater station;
wherein signalling and control information is transmitted and received by said central station on all network channels on frequencies which are outside the communication frequency bands in those channels, thereby permitting subscriber stations to serve as relay stations for control and signalling information without serving as a repeater for communications purposes.

32. The method of controlling communications between a network of subscriber stations positioned in a grid-like pattern of rows and columns such that each subscriber station has a location which can be uniquely defined by its successive numerical position in the grid-like pattern, said network including a central station which communicates with some subscriber stations directly and with some subscriber station via other subscriber stations, said method being characterized by the step of routing calls between any two subscriber stations A and B by solving the algorithm:

$$v = |y_A - y_B| + 1;$$

$$h = |n_A - n_B| + 1;$$

$$d = v - 1 \text{ for } v < h; \text{ and}$$

$$d = h - 1 \text{ for } v > h,$$

where $y_A = a_A - n_A L$, $y_B = a_B - n_B L$, $a_A$ is the grid position number of station A, $a_B$ is the grid position number of station B, $n_A$ is one less than the row number in which station A is located, $n_B$ is one less than the row number in which station B is located, L is the number of stations in a row, v is the minimum number of columns involved in a call between stations A and B, h is the minimum number of rows involved in a call between stations A and B, and d is the minimum number of diagonal connections involved in direct ranking of a call between stations A and B.

* * * * *